United States Patent
Takamoto et al.

(10) Patent No.: US 7,594,827 B2
(45) Date of Patent: Sep. 29, 2009

(54) SECURE AND/OR LOCKABLE CONNECTING ARRANGEMENT FOR VIDEO GAME SYSTEM

(75) Inventors: Junji Takamoto, Kyoto (JP); Daisuke Kumazaki, Kyoto (JP); Souichi Takagi, Tokyo (JP); Takaki Tsutsui, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 11/905,903

(22) Filed: Oct. 5, 2007

(65) Prior Publication Data

US 2008/0119291 A1    May 22, 2008

Related U.S. Application Data

(60) Provisional application No. 60/916,750, filed on May 8, 2007, provisional application No. 60/866,391, filed on Nov. 17, 2006.

(51) Int. Cl.
*H01R 24/00* (2006.01)
(52) U.S. Cl. .......................... 439/660; 439/353; 439/37; 439/680
(58) Field of Classification Search .................. 439/352, 439/353, 355, 356, 358, 607, 660
See application file for complete search history.

(56) References Cited

U.S. PATENT DOCUMENTS

| 4,405,192 | A | * | 9/1983 | Eaby et al. .................. 439/358 |
| 4,526,431 | A | | 7/1985 | Kasukawa |
| 5,014,947 | A | * | 5/1991 | Wang ......................... 248/214 |
| 5,080,604 | A | | 1/1992 | Rider et al. |
| 5,425,650 | A | | 6/1995 | Maeda |
| 5,564,939 | A | * | 10/1996 | Maitani et al. ............... 439/352 |
| 5,613,881 | A | | 3/1997 | Ichida et al. |
| 5,876,248 | A | | 3/1999 | Brunker et al. |
| 5,879,194 | A | | 3/1999 | Thenaisie et al. |
| 5,971,790 | A | | 10/1999 | Rohde |
| 6,056,578 | A | * | 5/2000 | Lin ............................ 439/358 |
| 6,099,339 | A | * | 8/2000 | Yanagida et al. ............ 439/358 |
| 6,309,255 | B1 | | 10/2001 | Yu |
| 6,416,346 | B1 | | 7/2002 | Nakamura |

(Continued)

FOREIGN PATENT DOCUMENTS

JP          2312173 A      12/1990

OTHER PUBLICATIONS

Mouser Catalog Download, MOLEX USB Connectors and Cable Assemblies, p. 979 (2007).

(Continued)

*Primary Examiner*—Neil Abrams
*Assistant Examiner*—Harshad C Patel
(74) *Attorney, Agent, or Firm*—Nixon & Vanderhye, P.C.

(57) ABSTRACT

Compatible mechanical and/or electrical connections to video game system accessories provide unique shape, design and dimensions that discourage or prevent non-compatible devices from being connected, connector configurations that allow connection only in a proper orientation to ensure electrical compatibility and eliminate the possibility of short-circuits, quick release locking arrangement firmly mechanically holds mating connectors together despite extensive movement of the game player's arms and hands, staged electrical contacting sequence provides proper signal application sequence, and wrist strap to tether handheld remote controller to hand is attached to a locking connector that mates with a connector of the remote controller.

30 Claims, 30 Drawing Sheets

PLUG

U.S. PATENT DOCUMENTS

| | | |
|---|---|---|
| 6,439,931 B1 | 8/2002 | Niitsu et al. |
| 6,484,365 B1 * | 11/2002 | Thompson .................. 24/3.12 |
| 6,799,986 B2 | 10/2004 | Igarashi et al. |
| 6,896,523 B2 | 5/2005 | Nishizawa et al. |
| 6,948,965 B2 * | 9/2005 | Kumamoto et al. ......... 439/358 |
| 6,948,984 B2 | 9/2005 | Chen et al. |
| 6,957,976 B2 * | 10/2005 | Zhang ........................ 439/358 |
| 7,014,490 B1 * | 3/2006 | Morikawa et al. ........... 439/352 |
| 7,033,218 B2 * | 4/2006 | Huang et al. ................ 439/607 |
| 7,052,186 B1 * | 5/2006 | Bates ........................... 385/59 |
| 7,104,842 B1 | 9/2006 | Huang et al. |
| 7,175,465 B1 * | 2/2007 | Tsai ............................ 439/352 |
| 7,252,531 B2 * | 8/2007 | Wu .............................. 439/358 |
| 7,285,016 B1 * | 10/2007 | Lai et al. ..................... 439/607 |
| 2002/0002015 A1 | 1/2002 | Mochizuki et al. |
| 2004/0072465 A1 | 4/2004 | Murakami |
| 2004/0106332 A1 * | 6/2004 | Kurimoto ................... 439/752 |
| 2005/0014418 A1 | 1/2005 | Ji et al. |
| 2005/0048830 A1 * | 3/2005 | Li et al. ...................... 439/358 |
| 2005/0048846 A1 | 3/2005 | Suzuki et al. |
| 2005/0064758 A1 * | 3/2005 | Li et al. ...................... 439/358 |
| 2005/0070148 A1 * | 3/2005 | Zhang ........................ 439/358 |
| 2005/0233808 A1 * | 10/2005 | Himoto et al. ................ 463/37 |
| 2006/0019545 A1 | 1/2006 | Moriyama et al. |
| 2006/0094301 A1 | 5/2006 | Lee et al. |
| 2006/0110971 A1 | 5/2006 | Wu |
| 2006/0110972 A1 | 5/2006 | Wu |
| 2006/0172609 A1 | 8/2006 | Wang et al. |
| 2006/0246765 A1 | 11/2006 | Wu |

OTHER PUBLICATIONS

Mouser "D" Connectors, Spectrum Control Inc., ESD/EMI Filtered USB Connectors & Patch Antenna Elements (2007).

Mouser Catalog Download, Telecom, DVI, HDMI , and Interface Connectors, p. 992 (2007).

Mouser Catalog Download, MOLEX Cable Assemblies, p. 881 (2007).

Mouser Electronics, New Products at Mouser Electronics, New Interconnects, 8 pp. (copyright 1996-2007.

Photo of Nintendo DS Game Cartridge.

\* cited by examiner

PLUG

PLUG

PLUG

PLUG

PLUG

PLUG

PLUG

PLUG AND SOCKET

PLUG AND SOCKET

PLUG AND SOCKET

PLUG AND SOCKET

PLUG AND SOCKET

PLUG AND SOCKET

PLUG AND SOCKET

PLUG AND SOCKET

PLUG AND SOCKET

PLUG AND SOCKET

PLUG AND SOCKET

PLUG AND SOCKET

PLUG

PLUG

PLUG

PLUG SIDE

PLUG SIDE

SOCKET

SOCKET SIDE

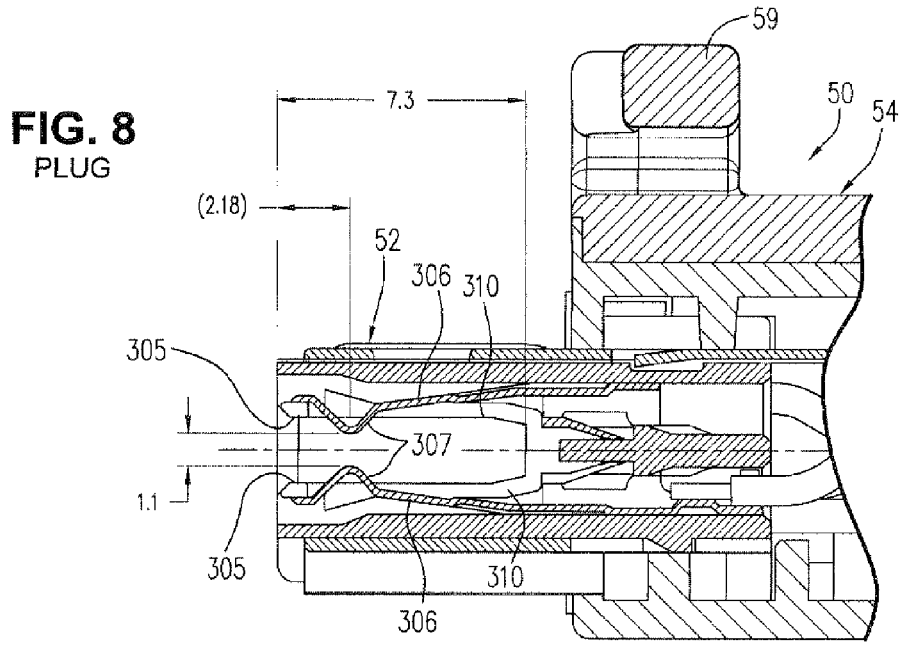
FIG. 8
PLUG
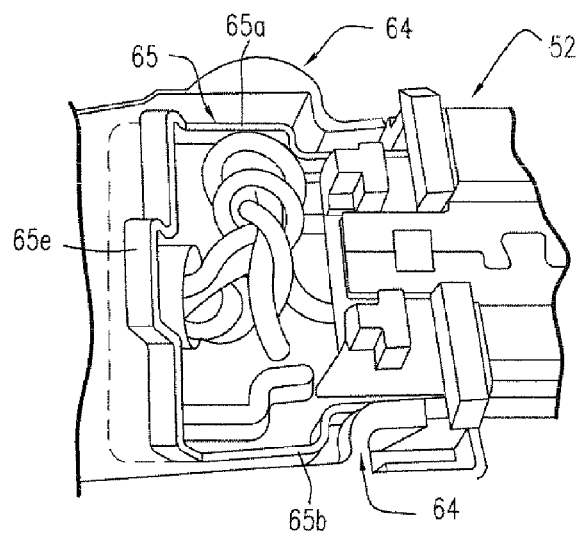
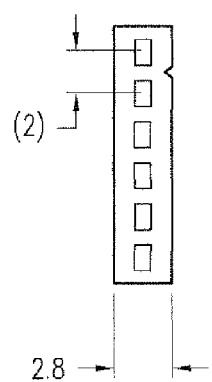
FIG. 9
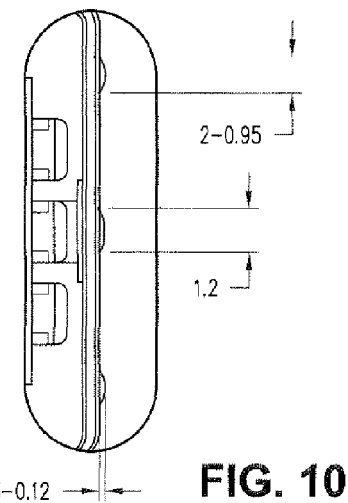
FIG. 8A
PLUG
FIG. 10

SOCKET

SOCKET

SOCKET

SOCKET

SOCKET

SOCKET

SOCKET

SOCKET

SOCKET

SOCKET

SOCKET

SOCKET

SOCKET

SOCKET

SOCKET

SOCKET

SOCKET

SOCKET

PLUG

PLUG

PLUG

PLUG

PLUG

PLUG

PLUG

PLUG

PLUG

PLUG

PLUG

PLUG

PLUG

PLUG

PLUG

PLUG

SECURE AND/OR LOCKABLE CONNECTING ARRANGEMENT FOR VIDEO GAME SYSTEM

CROSS-REFERENCE TO RELATED APPLICATION

This application claims the benefit of priority from provisional application No. 60/866,391 filed Nov. 17, 2006, and provisional application No. 60/916,750 filed May 8, 2007, both of which are incorporated herein by reference.

TECHNICAL FIELD

The technology herein relates to electrical connectors for video game systems, and more specifically to electromechanical connecting arrangements for connecting with video game input, peripheral and/or other devices. Still more particularly, the technology herein relates to methods, apparatus and techniques for providing reliable electrical and mechanical connectivity between 3D video game system components while preventing or discouraging incompatible and/or unauthorized device connections. The technology herein also relates to a secure lockable connector arrangement for video game system peripheral or other devices.

BACKGROUND AND SUMMARY

Video game system designers spend enormous amounts of time, effort, energy, money and other resources designing new video game systems for the consumer electronics market. A vast amount of human factor and other engineering typically goes into video game designs to make them successful and popular with consumers. For example, a video game input device such as a remote controller, handheld controller, joystick or the like should be capable of providing fine and other flexible user control inputs while at the same time being able to withstand various forms of physical abuse from small children. There are significant challenges to designing, developing and manufacturing video game consumer electronics hardware that is easy to use, very capable, highly reliable, rugged, flexible, compact, relatively low cost and a pleasure to operate.

A video game system designer may become disappointed if a competitor attempts to "knock off", copy or otherwise attempt to develop unlicensed or unauthorized substitute input devices. Video game input devices that are cheaply made without the requisite human factor engineering tend to disappoint consumers. Furthermore, it is important for reliability, safety, avoiding damage and other reasons that only those devices intended to be connected are in fact able to be connected. It is undesirable to allow an unauthorized or unlicensed video game accessory manufacturer to get a "free ride" by selling certain types of products designed to interoperate with the video game system without first obtaining permission from or otherwise working out an agreement with the video game system manufacturer.

Some in the past have used complex electronic authentication or other elements to ensure that accessory hardware and software manufacturers obtain proper licenses and permissions. For example, many video game system software, disks and cartridges are protected by security systems that allow the system to determine whether software is authentic. The system can refuse to run software that is not authentic. While it may be possible and desirable to include electronic encryption and authentication on hardware accessory signal pathways, more fundamental approaches can also be effective.

The technology herein relates to a new and improved electromechanical connector arrangement for use in a video game system and/or other application. Exemplary illustrative non-limiting features include:

Unique shape, design and dimensions that discourage or prevent connection of non-compatible devices Male connector insertion portion defines receiving socket containing electrical contacts, and female connector socket has protrusion having electrical contact strips disposed thereon for pressure insertion into and engagement with the male connector receiving socket Connector configurations that ensure connection in a proper orientation to provide electrical compatibility and eliminate the possibility of short-circuits Quick release locking arrangement that firmly mechanically holds mating connectors together despite extensive movement of the game player's arms and hands Staged electrical contacting sequence provides proper sequence for applying signals Wrist strap tethering handheld remote controller to hand is attached to a locking connector that securely mates with a connector of the remote controller High reliability and long life Very rugged design in a compact low cost package Easy to manipulate and operate to insert and release Positive coupling with tactile feel so users know when connection is successful Positive interlock securely fastens and holds connectors together despite active motion by users holding onto handheld controllers the connector is used to couple together Good strain resistance preventing cable from being forceably pulled out of connector Combination insertion/receiving interlocking portions on both male and female connectors provide mechanical strength when connectors are mated Other advantageous non-limiting features

BRIEF DESCRIPTION OF THE DRAWINGS

These and other features and advantages will be better and more completely understood by referring to the following detailed description of exemplary non-limiting illustrative implementations in conjunction with the drawings of which:

FIG. 2D-1 shows an exemplary illustrative non-limiting implementation of how retractable nibs of the FIG. 1 male connector can engage with exemplary female mating connector nib retaining slots;

FIG. 8 is a cross-sectional more detailed view of an exemplary illustrative non-limiting locking mechanism showing the retractable locking nibs operated by finger-depressible actuators;

FIG. 8A shows in detail an exemplary illustrative non-limiting internal locking mechanism structure portion of the FIG. 1 connector;

FIGS. 9 and 10 show exemplary electrical contacting arrangements including dimensions in millimeters;

DETAILED DESCRIPTION

Figure 1:
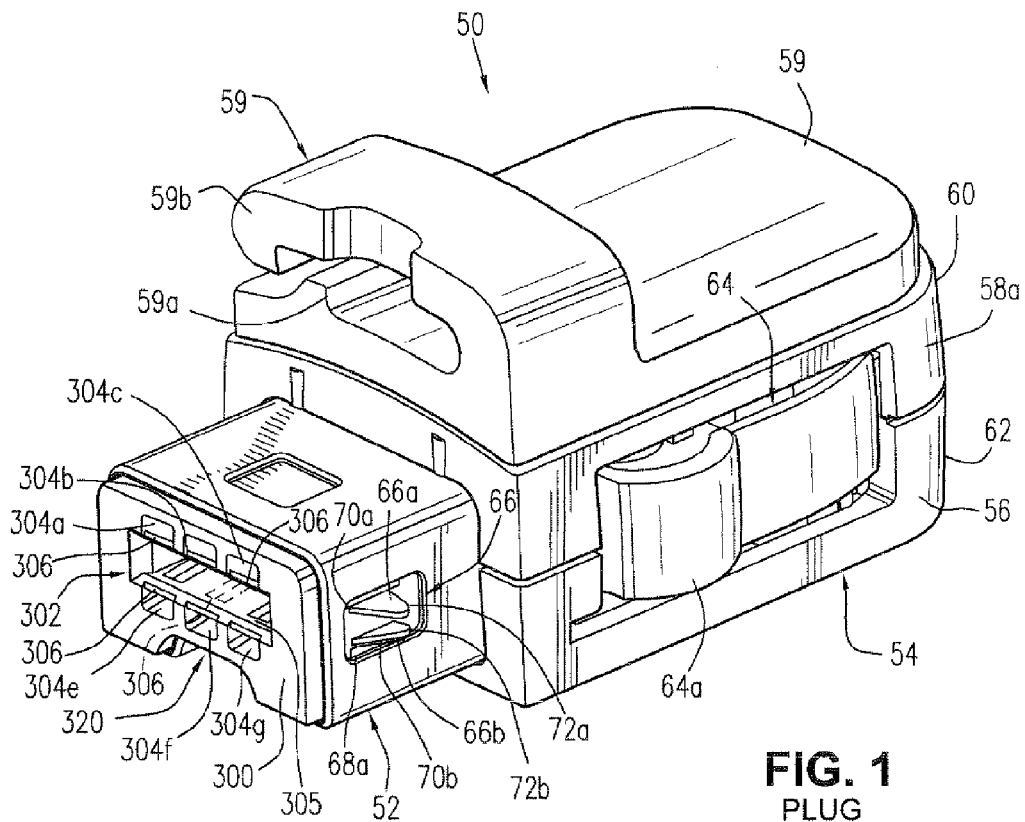
FIG. 1 is an elevated front right perspective view of an exemplary illustrative non-limiting male connector plug as seen from near the connector's insertion end.

FIG. 1 is a perspective view of an exemplary illustrative non-limiting electrical connector plug 50. Electrical connector plug 50 can be used, for example, to electrically connect a video game accessory including but not limited to a "nunchuk", "classic controller" or other device to another video game unit such as for example a handheld remote control. These are exemplary illustrative non-limiting examples—connector 50 can be used to connect any device to any other device.

Exemplary illustrative non-limiting electrical connector plug 50 includes an insertion portion 52 and a manually grippable portion 54. Insertion portion 52 in one exemplary illustrative non-limiting implementation forms a male portion of a connector that mates with a female connector receptacle or socket 100 (See FIGS. 2E and following). Grippable portion 54 is intended to be gripped by human digits (fingers and thumb of the human hand) to allow a user to easily manually, and in a locking manner, insert the connector plug 50 into and to remove (unlock) the connector plug 50 from a corresponding mating female connector socket 100.

In the exemplary illustrative non-limiting implementation shown, grippable portion 54 includes a generally box-like housing 56 including grippable side walls 58a, 58b. Housing 56 can be of two-piece construction with a top (upper) case portion 60 joining with a bottom (lower) case portion 62. Upper and lower or top and bottom housing case portions 60, 62 can be for example made of molded hard plastic, white "66Nylon" material or any other suitable durable material.

The upper and lower housing case portions 60, 62 when coupled together (e.g., using retaining screws, adhesive, or any other convenient fastening system) encapsulate and protect internal portions of the connector assembly to make the connector plug 50 rugged and allow it to stand up to abuse from children and others. In other exemplary illustrative non-limiting implementations, housing 56 as shown could be eliminated and some other arrangement used (or omitted as desired) for electrically connecting the connectors of a cable (not shown) to the insertion portion 52.

In the exemplary illustrative non-limiting implementation, the connector plug housing 56 is of a convenient size for grasping or gripping between a thumb and other digit (e.g., forefinger, middle finger, etc.). See FIG. 2A for example. Dimensions can be for example 17 mm wide by 23.5 mm long by 9.7 mm high in one exemplary illustrative non-limiting implementation. See for example FIGS. 3 and 4. Such a size is convenient to be grasped by adults and small children. Other dimensions are possible.

In one exemplary illustrative non-limiting implementation, the male connector plug 50 has a wrist strap hook 59 mounted on its housing 56. Wrist strap hook 59 can comprise for example a separate layer of clear strong durable plastic or other similar material providing a ridge 59a and a hook structure 59b. The purpose of ridge 59a and hook structure 59b in one exemplary illustrative non-limiting implementation is to retain a nylon or other durable fabric or other wrist strap (e.g., loop) so the device into which the male connector plug 50 (e.g., a handheld remote controller) can be anchored to the user's hand or wrist.

Since illustrative non-limiting implementations shown herein have a rugged, strong locking mechanism that locks the male connector plug 50 to a mating female connector socket 100 (and thus for example to a handheld device which provides the mating female connector socket), it is sufficient in the exemplary illustrative non-limiting implementation to anchor the wrist strap to the connector 50 which mates with the handheld device (direct connection of the wrist strap to the handheld device itself is thus not necessary in one exemplary illustrative non-limiting implementation). In other implementations, a wrist strap could be anchored directly to the handheld device as opposed to the connector, or it could be omitted. In some exemplary illustrative non-limiting implementations, a sensor of some sort (e.g., optical) is provided to detect whether the wrist strap is being used and in some cases to prevent games or other applications from operating unless the wrist strap is physically in place. The wrist strap could be replaced with a lanyard or any other desired arrangement.

Exemplary Illustrative Non-Limiting Secure Locking Mechanism

Figure 2:
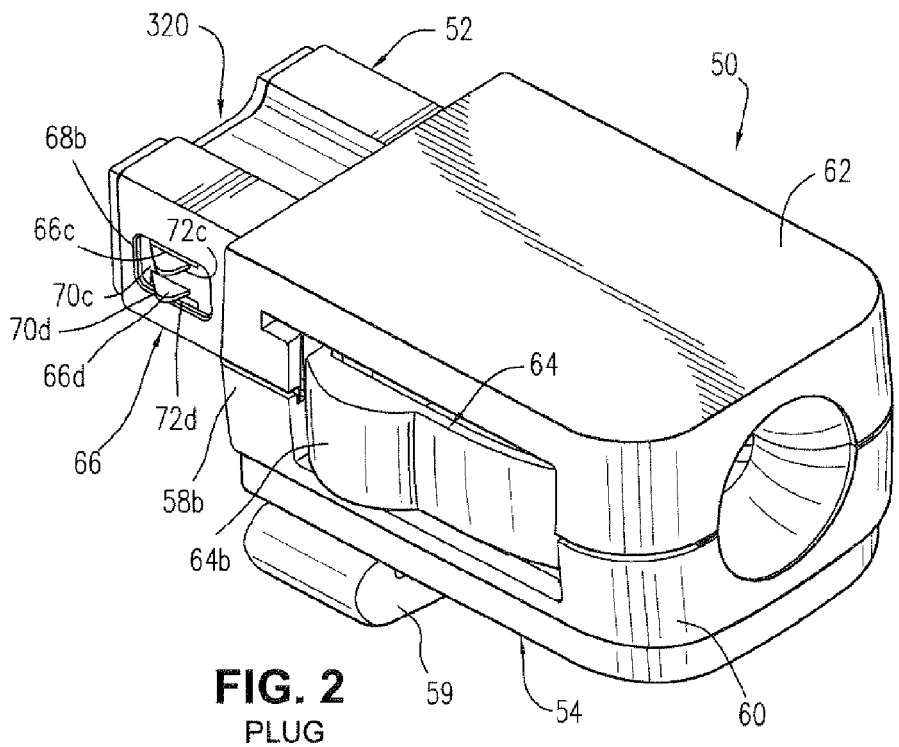
FIG. 2 is an elevated rear left perspective view of the FIG. 1 male connector plug inverted and as seen from behind the connector's cable receiving portion.
Figure 2A:
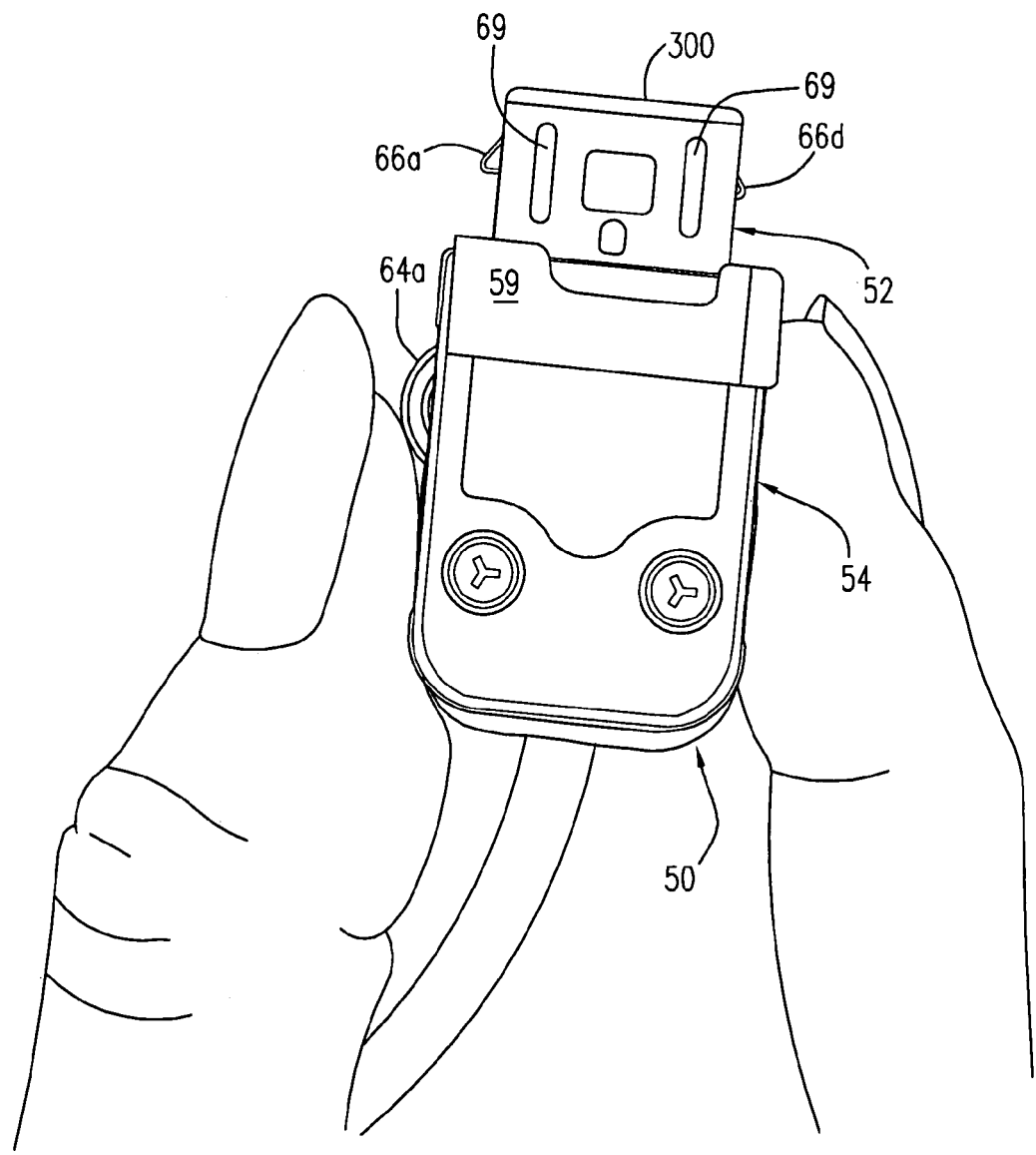
FIGS. 2A & 2B show the FIG. 1 male connector plug being squeezed between a finger and thumb to partially retract locking nibs used to lock the connector in a mating position.
Figure 2B:
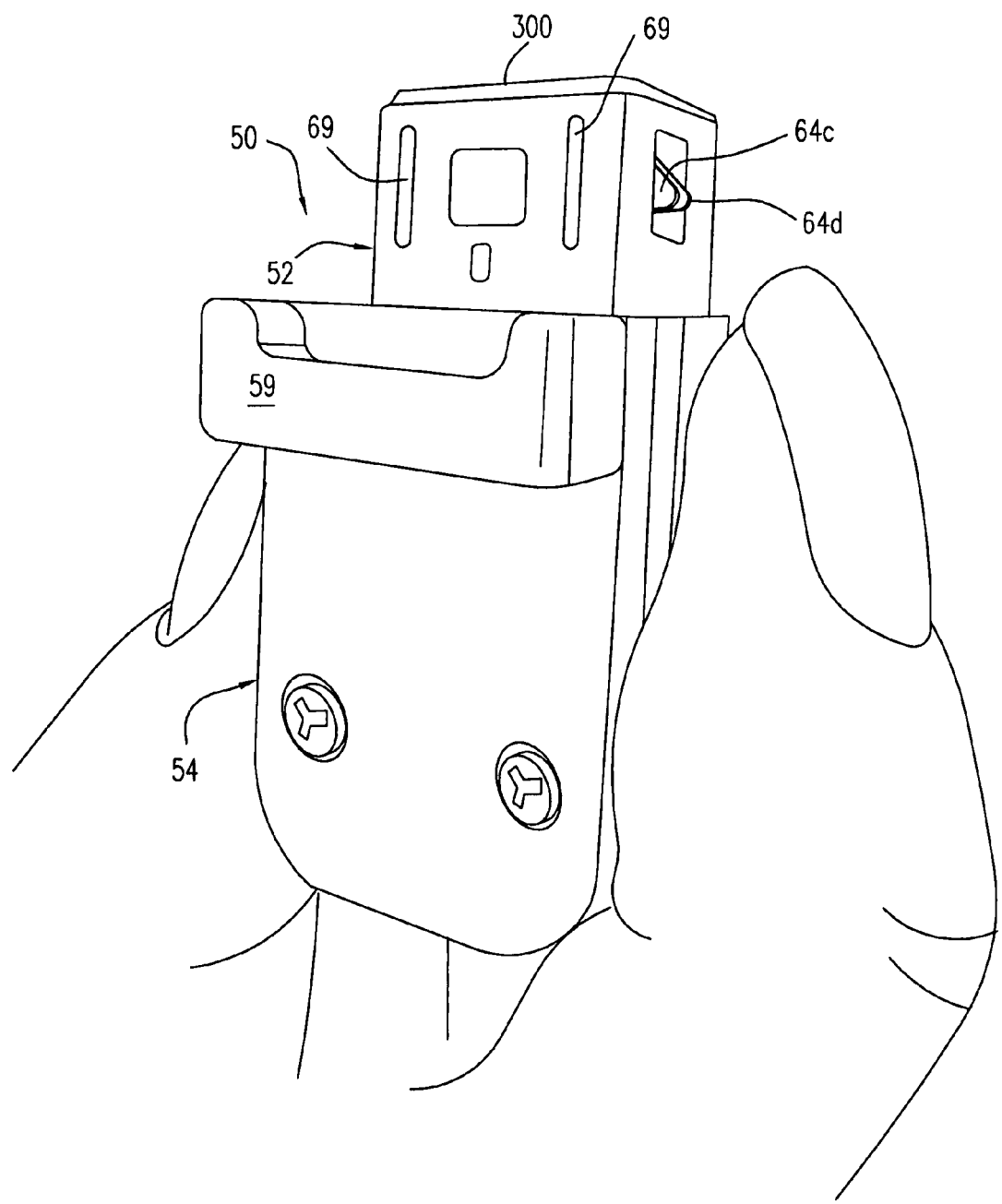
Figure 2C:
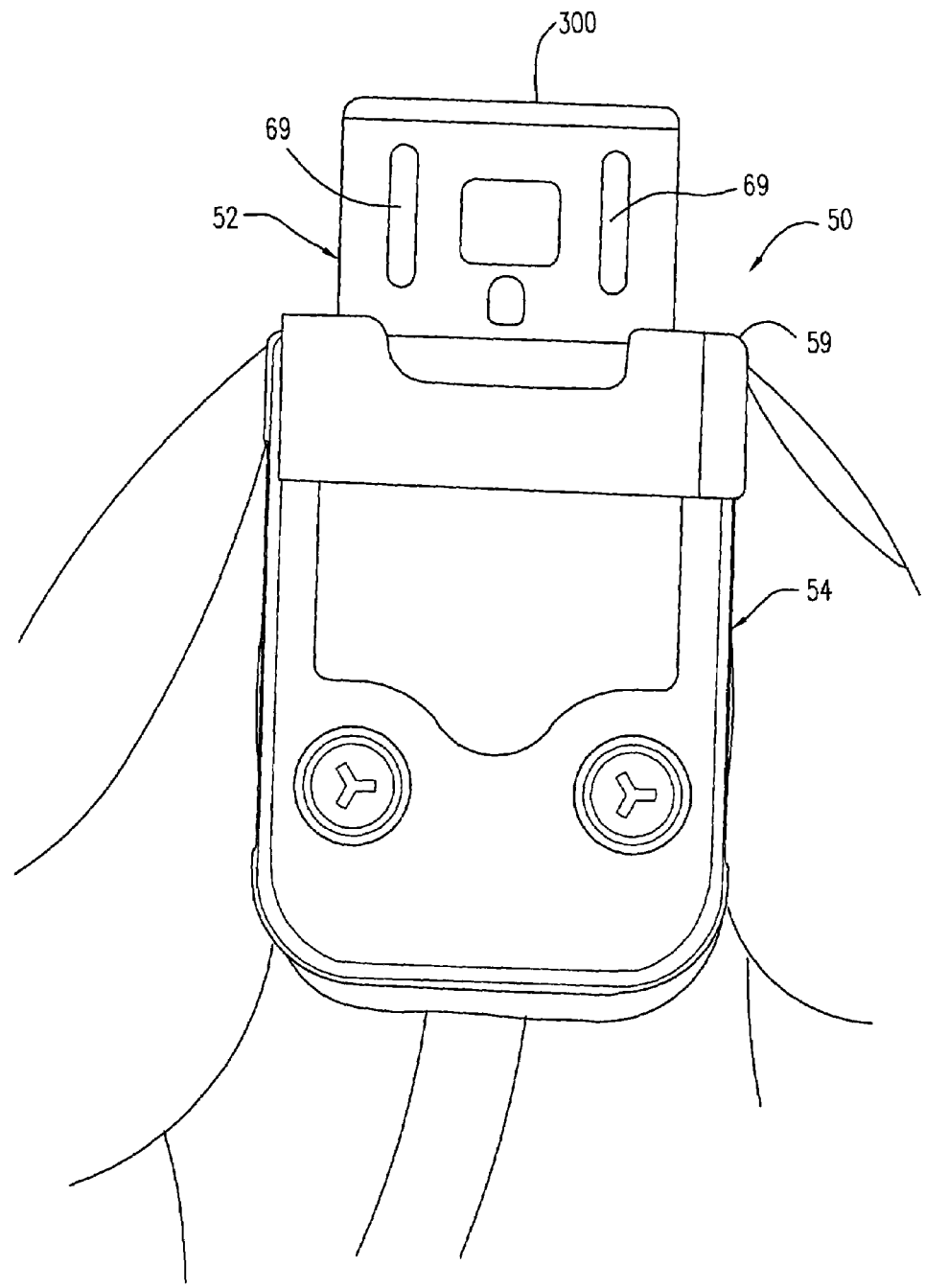
FIG. 2C shows fully retracted locking nibs.
Figure 2D:
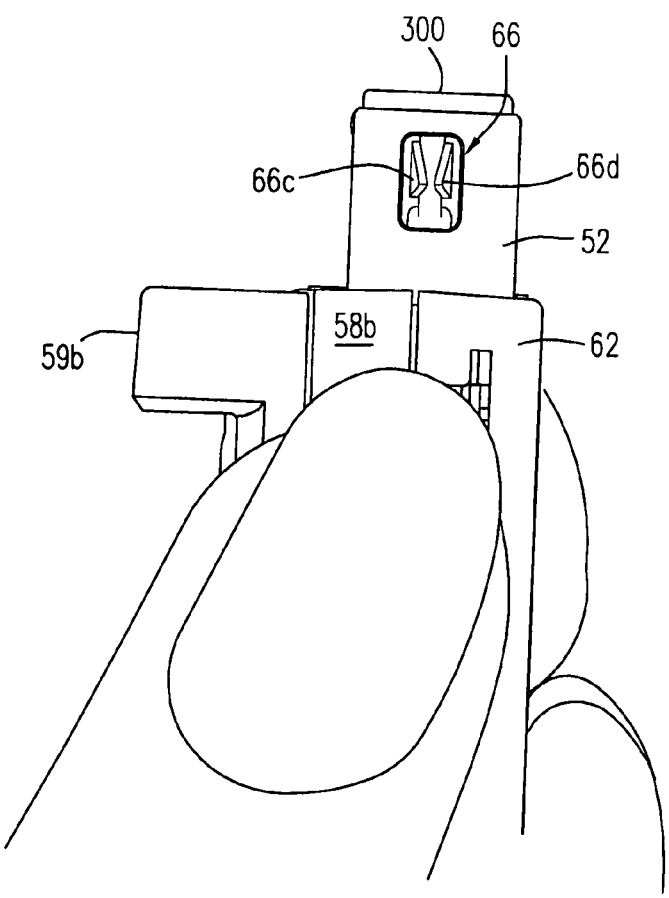
FIG. 2D shows exemplary illustrative non-limiting retractable locking nibs in more detail.
Figures 1, 2D:
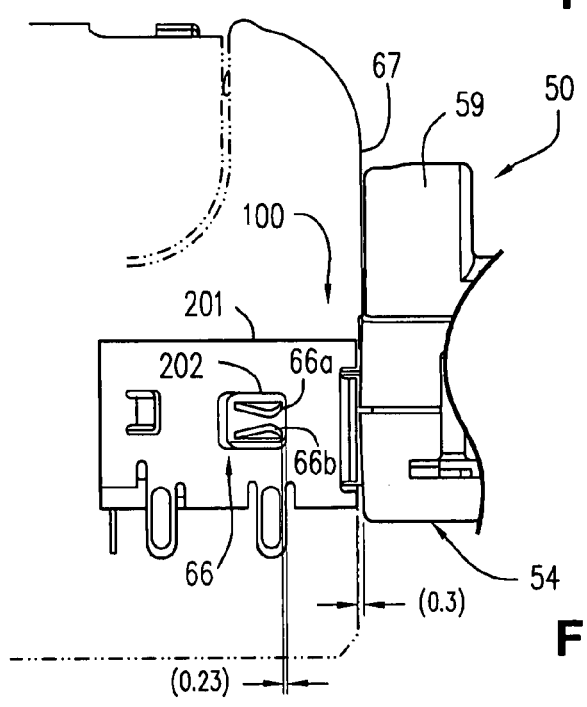
Figure 2E:
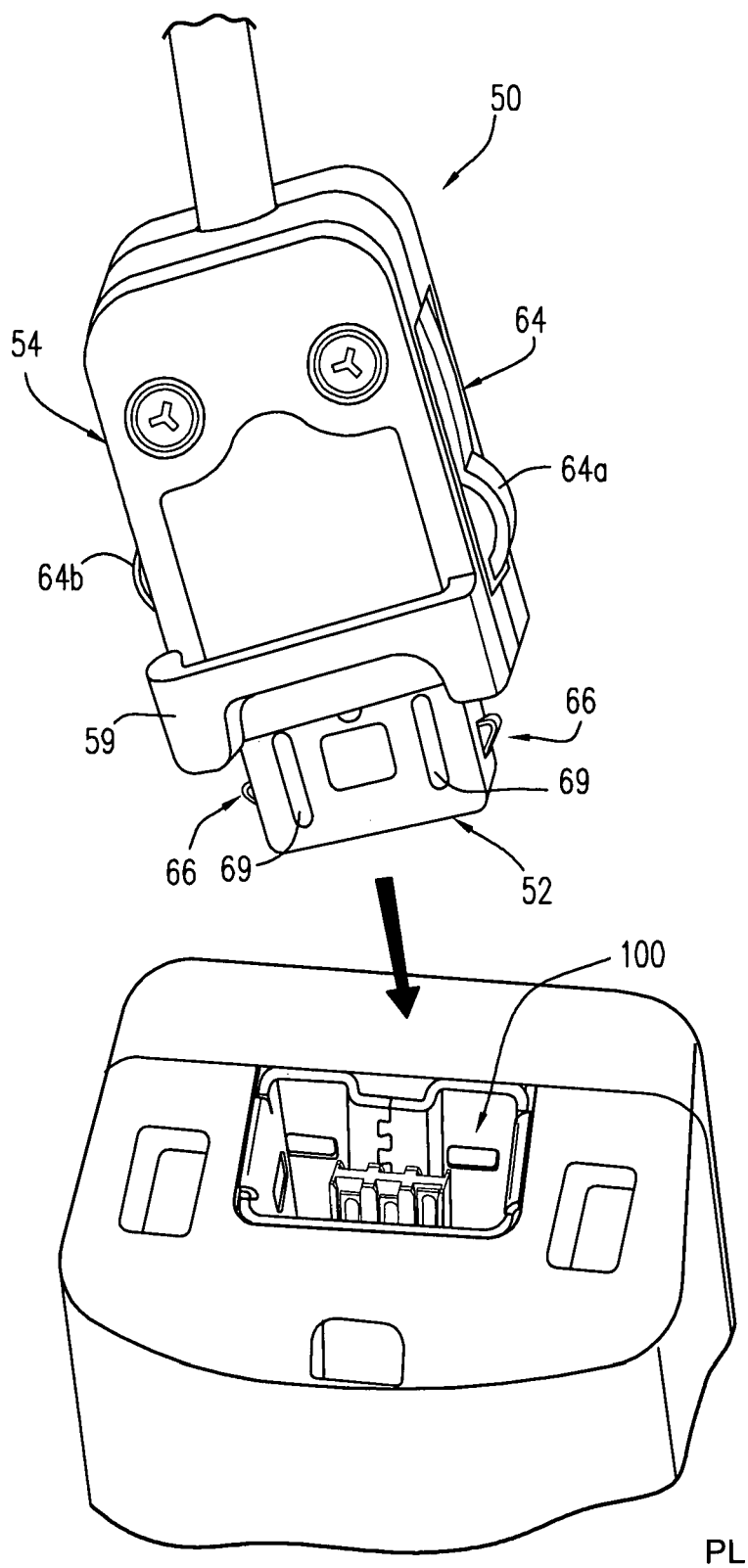
FIGS. 2E-2P show an exemplary illustrative non-limiting plug and socket connector mating sequence (and, if viewed in reverse, an unmating/release sequence) from different perspectives.
Figure 2F:
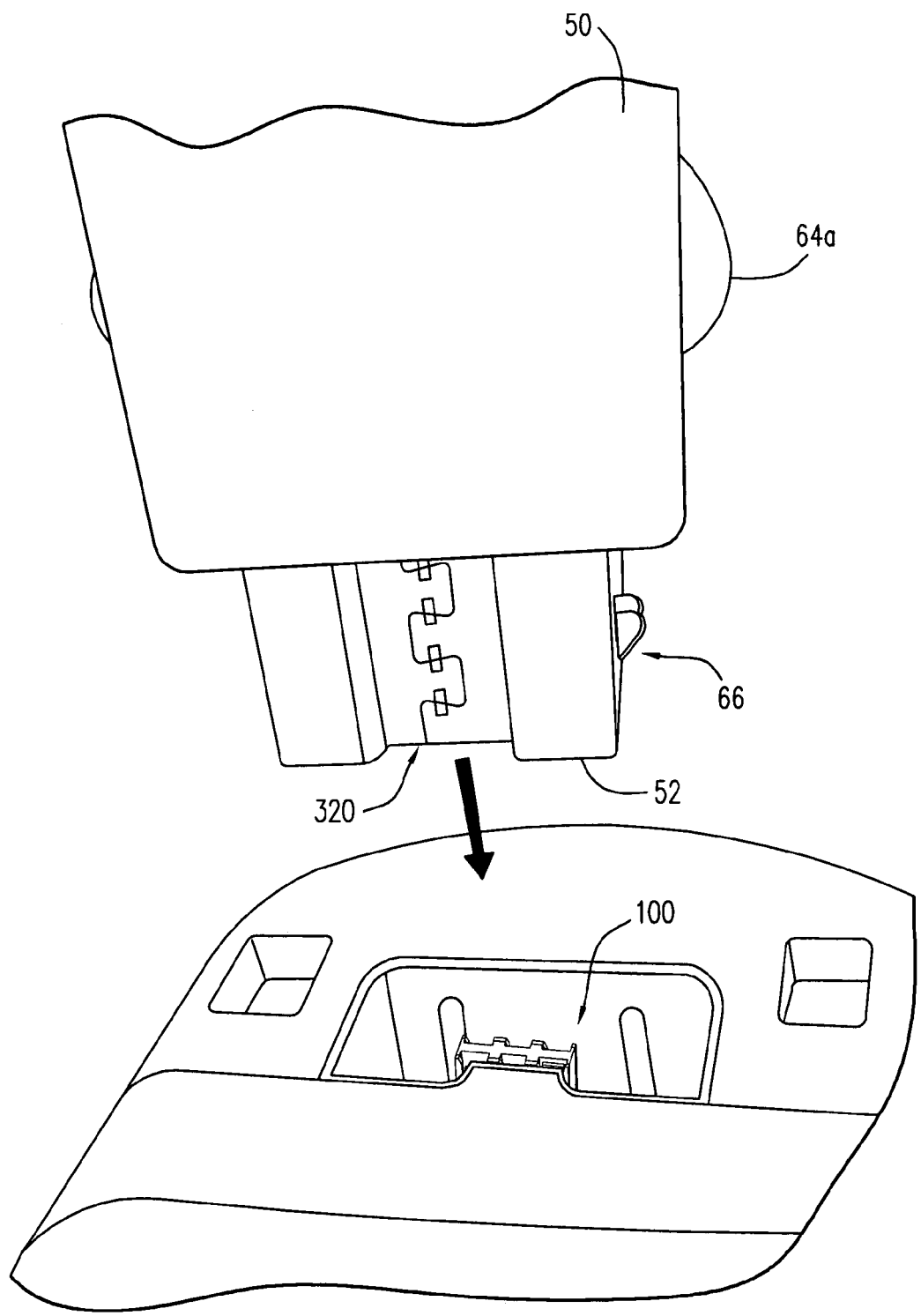
Figure 2G:
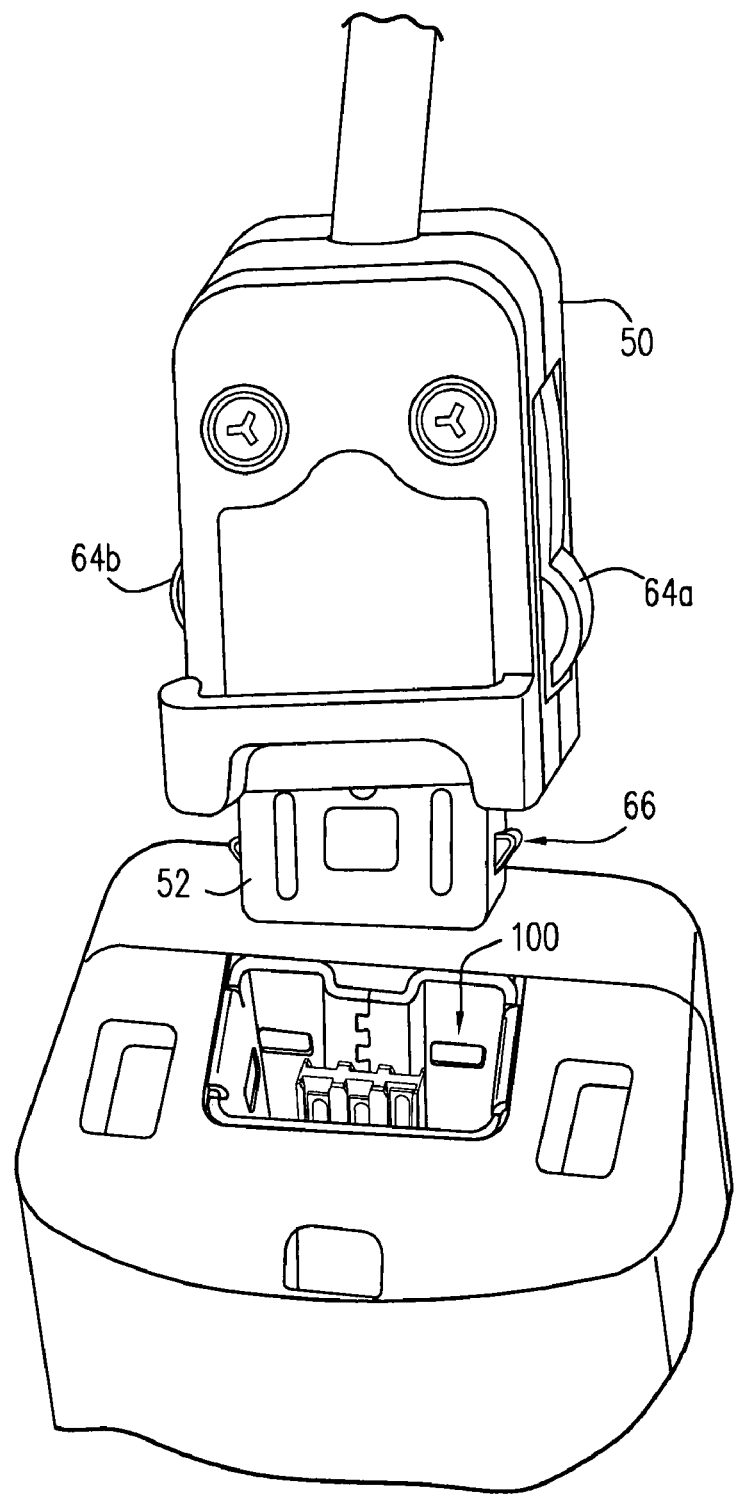
Figure 2H:
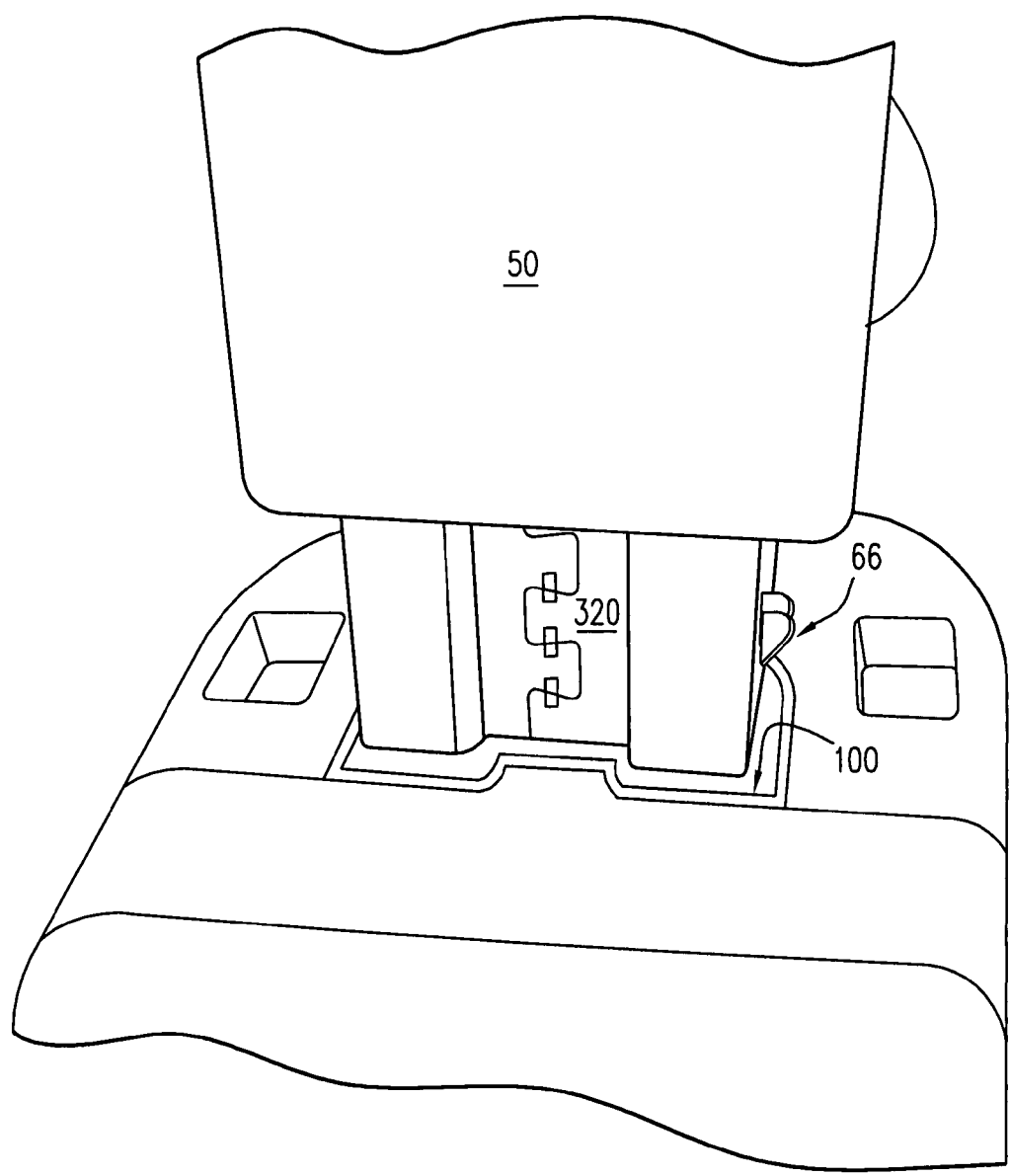
Figure 2I:
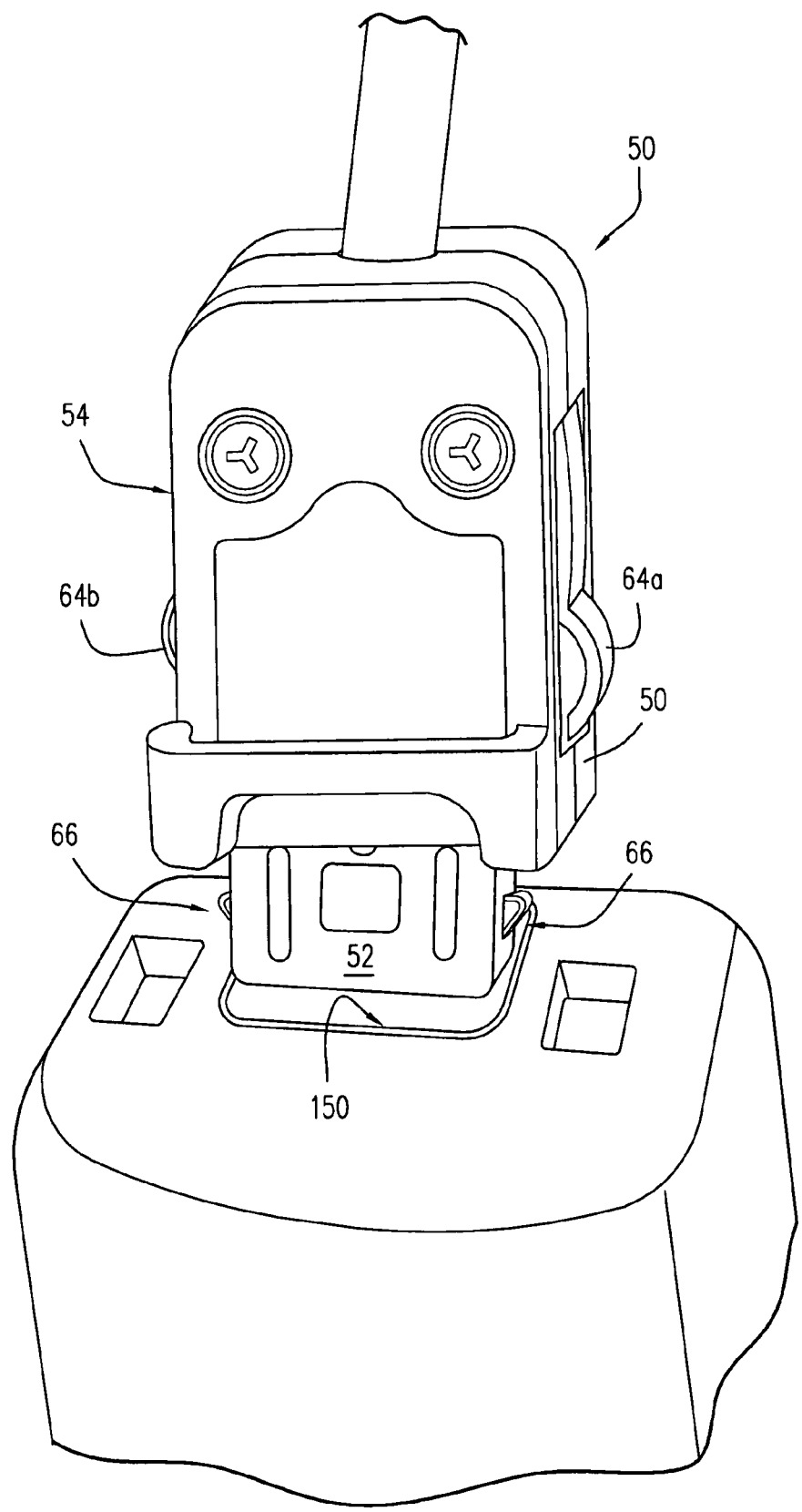
Figure 2J:
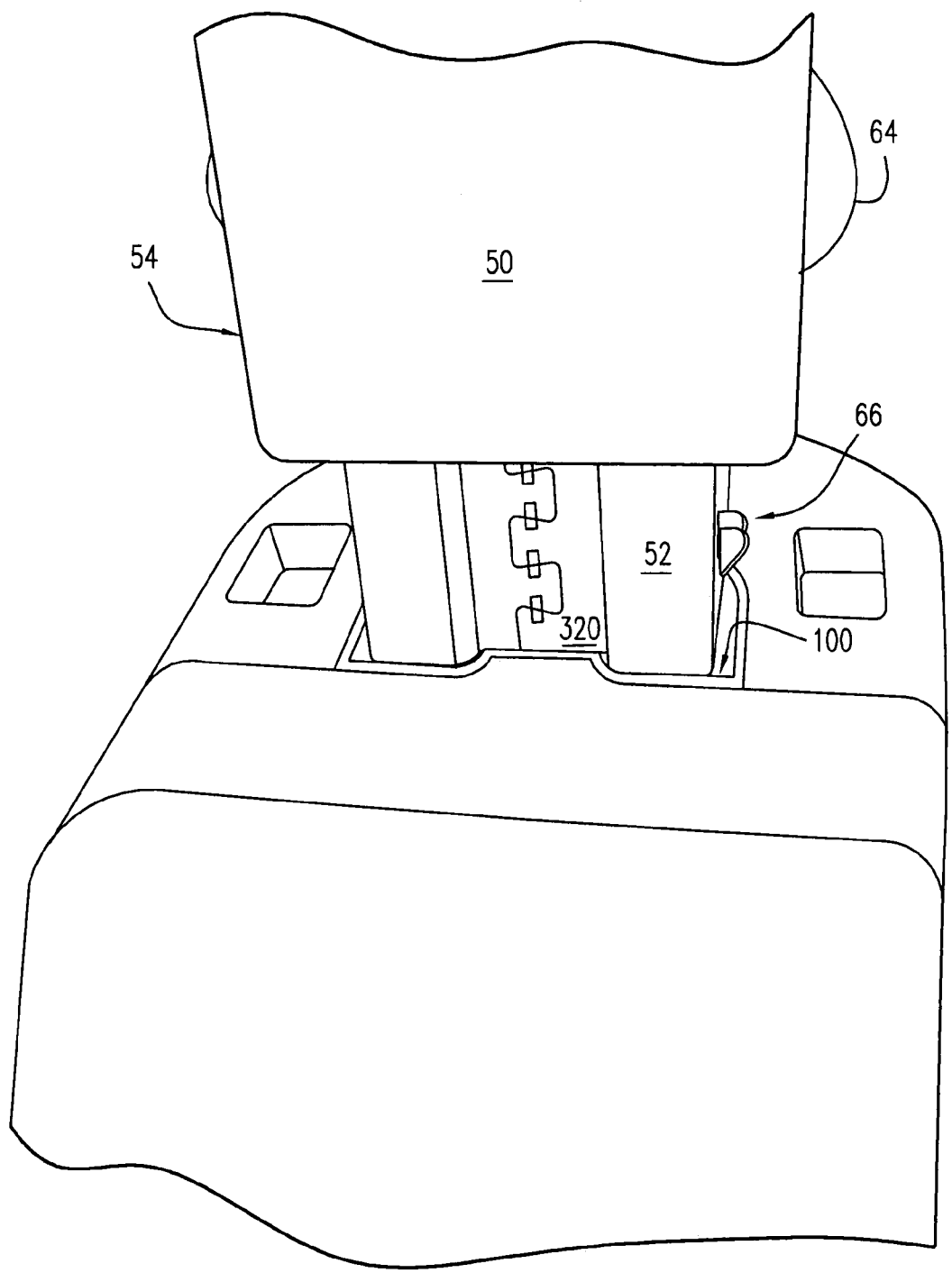
Figure 2K:
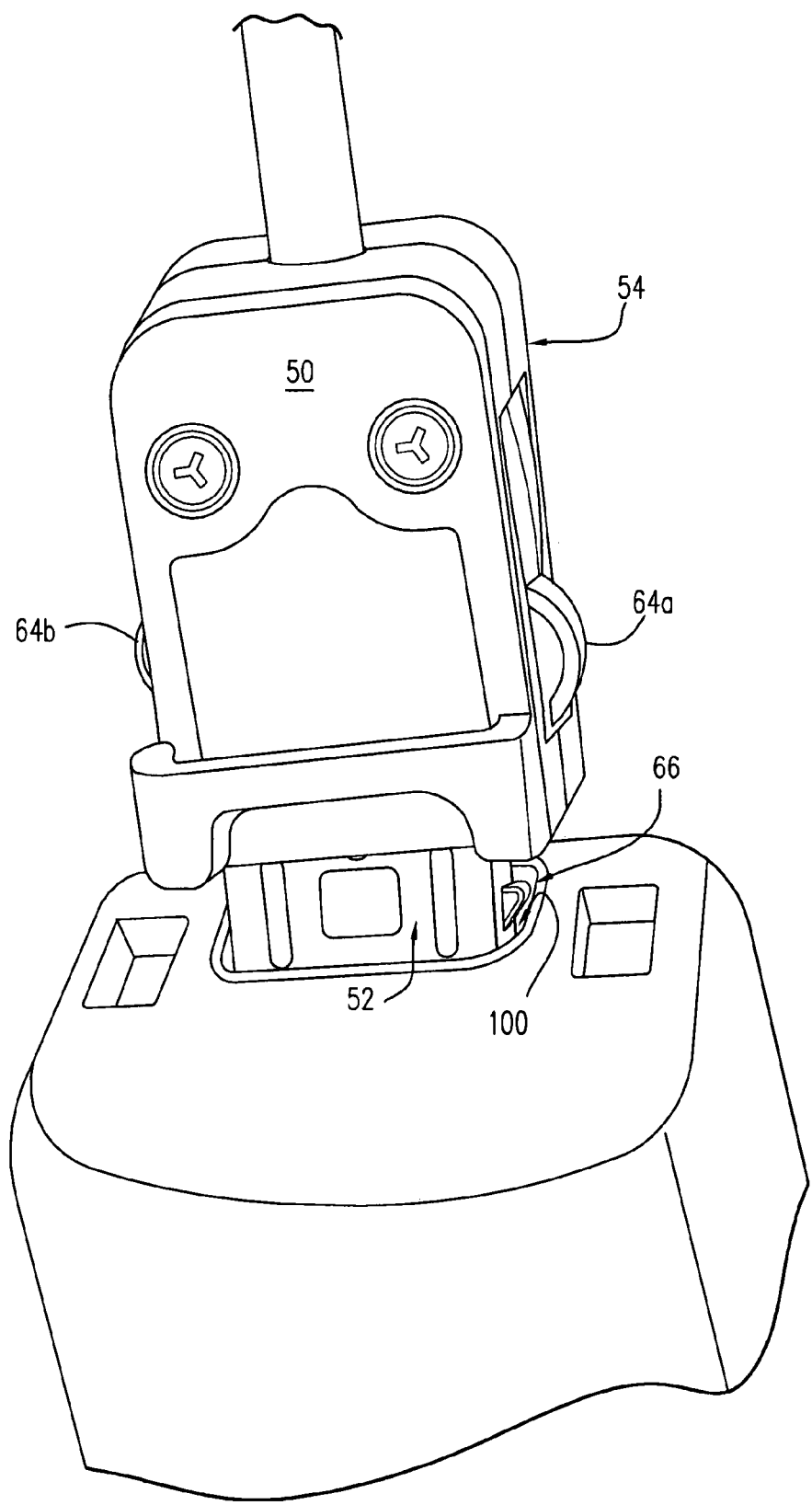

An exemplary illustrative non-limiting implementation includes a secure locking mechanism including control arms 64, locking nibs or tangs 66, and slots or other openings defined within a mating connector in registry with the locking nibs or tangs (see FIG. 2E). In one exemplary illustrative non-limiting implementation, the thumb for example can be placed into contact with sidewall 58a and a finger can be placed into contact with sidewall 58b. When the user grasps connector plug 50 in the way shown in FIG. 2A and exerts pressure against the sidewalls 58a, 58b, the user may inwardly depress control arms 64a, 64b. Arms 64a, 64b provide a control feature for the locking mechanism. In more detail, in one exemplary illustrative non-limiting implementation, nibs 66 are normally biased to project outwardly through openings 68. In the exemplary illustrative non-limiting implementation, locking nibs 66 have ramped, angled or inclined leading edges 70 and flat (non-angled) following edges 72. As shown in FIG. 2C (and see also FIG. 8A internal view), these retractable nibs 66 may be integrally formed (e.g., by conventional metal cutting and bending manufacturing processes) on metal members 65a, 65b that integrally extend alongside the control arms 64a, 64b. Two such retractable nibs 66 are formed on each metal member in the exemplary illustrative non-limiting implementation, although other exemplary embodiments could have one nib, more than two nibs, some locking structure other than a nib, or no locking structure at all.

In the exemplary illustrative non-limiting implementation, control arms 64 and associated retractable nibs 66 are mechanically biased (see FIGS. 1 and 2) such that, at rest, the locking nibs 66 are fully extended. In the exemplary illustrative non-limiting implementation, nibs 66 can be forced to retract in two ways: (a) by the user depressing control arms 64 (for unlocking action), and (b) when the connector plug insertion portion 52 is inserted into a snugly fitting receptacle (leading up to locking action) which applies retracting pressure directly onto the nibs in a direction that is substantially perpendicular to the direction in which the associated control arm extends. In the exemplary illustrative non-limiting implementation, inserting the connector plug insertion portion 52 into a female receptacle thus causes a locking action, and user depression of control arms 64 causes an unlocking action. As FIG. 8A shows, the metal members 65a, 65b are part of a U-shaped structure 65 that is formed with a stiffening cross base 65c that holds the members 65a and 65b in an outwardly biased position, but which allows the members (and hence the nibs 66) to flex inwardly when pressure is applied to the control arms 64a, 64b. The metallic structure 65 can serve double duty as a cable retaining structure.

Figure 2L:
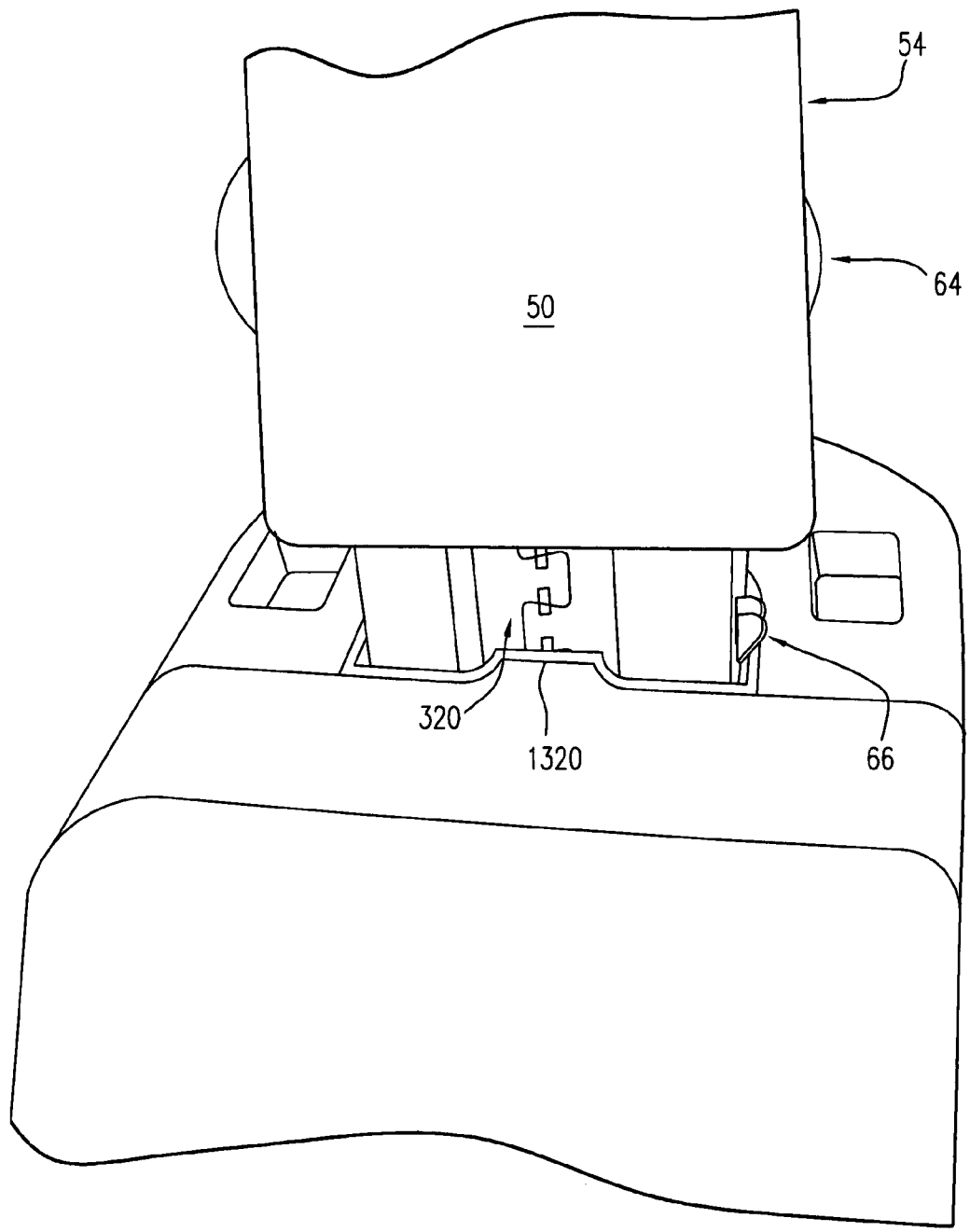
Figure 2M:
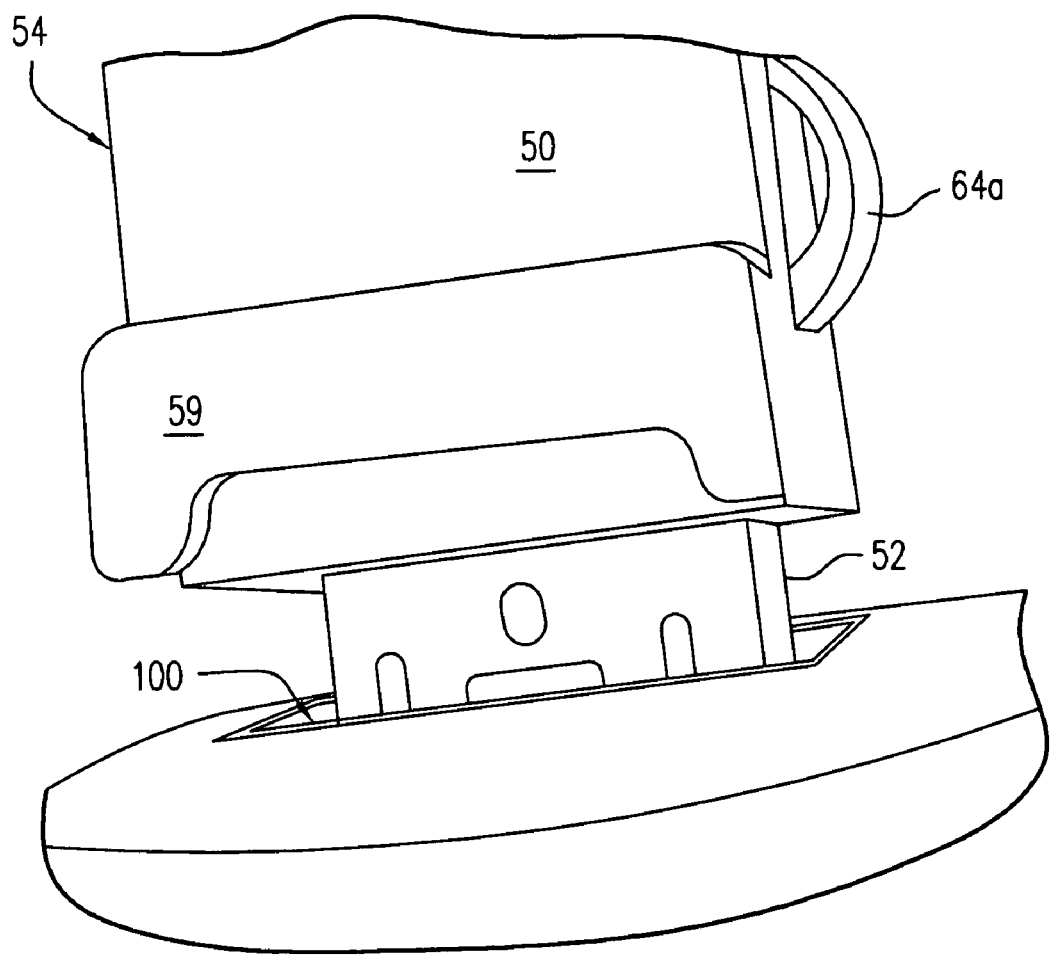

In more detail, when the user grasps the connector plug housing 54 between the thumb and a finger and applies pressure to the control arms 64 and at this stage may or may not cause retractable nibs 66 to retract (see FIGS. 2A-2D). The user may insert the plug insertion portion 52 into a corresponding conformal or other snugly fitting female connector socket 100 (see FIGS. 2E-2K) and apply pressure onto the connector to force the connector insertion end further into the female connector socket. A point is reached (see FIG. 2L) at which the retractable locking nibs 66 contact the outer edges of the connector socket 100 and the retractable nib biasing forces offer some resistance to further insertion. If the user continues to increase or otherwise provide applied insertion force, the socket wall will apply a side directed component of that axially directed insertion force to the retractable nibs 66 to cause the nibs to retract sufficiently to clear the socket opening (see FIG. 2M and following). Such retraction of nibs 66 can occur whether or not the user is applying pressure to the control arms 64.

Insertion is smoother and easier if the user is applying pressure to the control arms 64, but the force that the insertion wall of the female connector socket applies to the retractable nibs 66 will cause the nibs to retract irrespective of whether the user is applying force to control arms 64. Even though they are partially retracted, the nibs 66 are outwardly biased in the exemplary illustrative non-limiting implementation such that they remain in close biased contact with the female socket inner wall and exert a frictional force thereon. However, in the exemplary illustrative non-limiting implementation, the contact is between smooth metal surfaces so the frictional insertion force is relatively small, so as not to substantially impede insertion progress. Meanwhile, proper registration between the plug 50 and the socket is ensured by channel 320 conformally in registry with an engaging ridge 1320 disposed on an insertion wall of the female socket.

Thus, in the exemplary illustrative non-limiting implementation shown, retractable nibs 66 serve to automatically retract as the connector insertion portion 52 is inserted into a corresponding snugly-fitting female receptacle. If corresponding locking grooves, openings or other structures in registry with locking nibs 66 are provided, the locking nibs may then automatically protrude into the corresponding structures in registration therewith, such that the trailing edges 72 abut corresponding edges of grooves, holes or the like and thereby substantially prevent the connector insertion portion 52 from being removed from a corresponding female receptacle unless either the control arms 64 are depressed to retract the nibs or a substantial amount of pressure is applied.

FIG. 2D-1 shows one such exemplary illustrative non-limiting female connector socket engaging structure including a metal housing 201 defining a pair of rectangular openings or slots 202 (only one is shown), each rectangular opening being dimensioned to accept a pair of nibs 66, the openings being positioned so that the nibs engage with the opening when male connector plug 50 is substantially fully inserted into and thus fully mated with female connector socket 100.

Figure 2N:
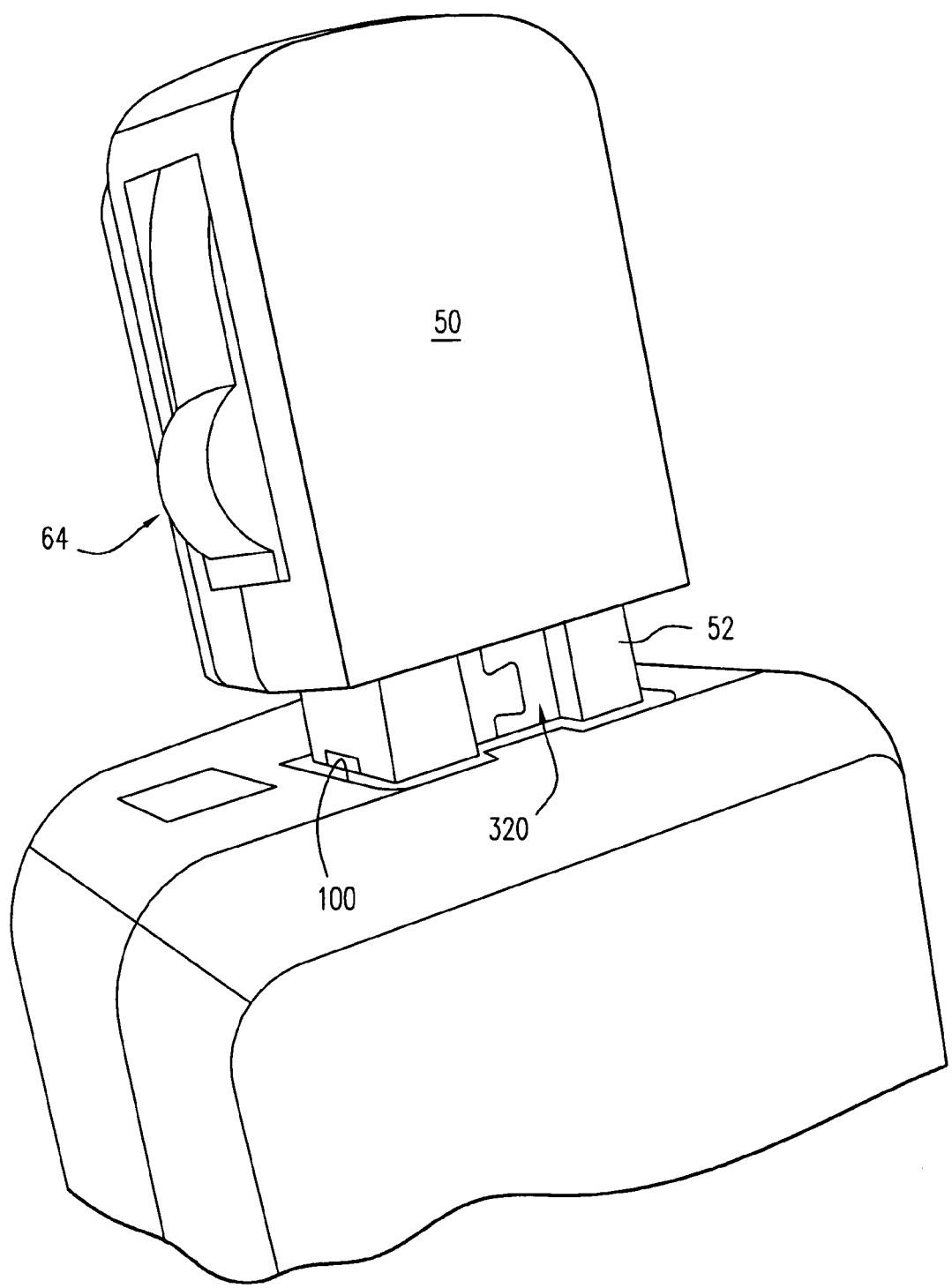
Figure 2O:
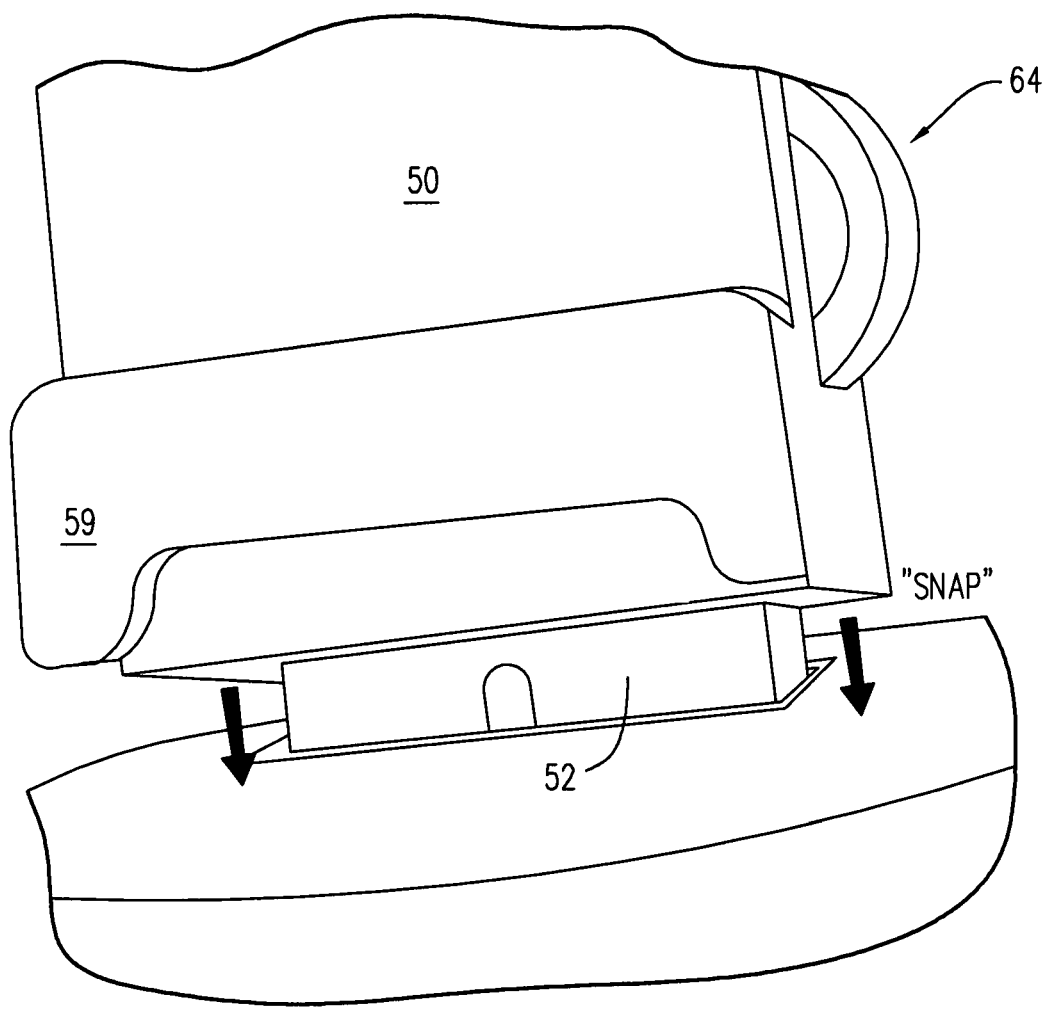
Figure 2P:
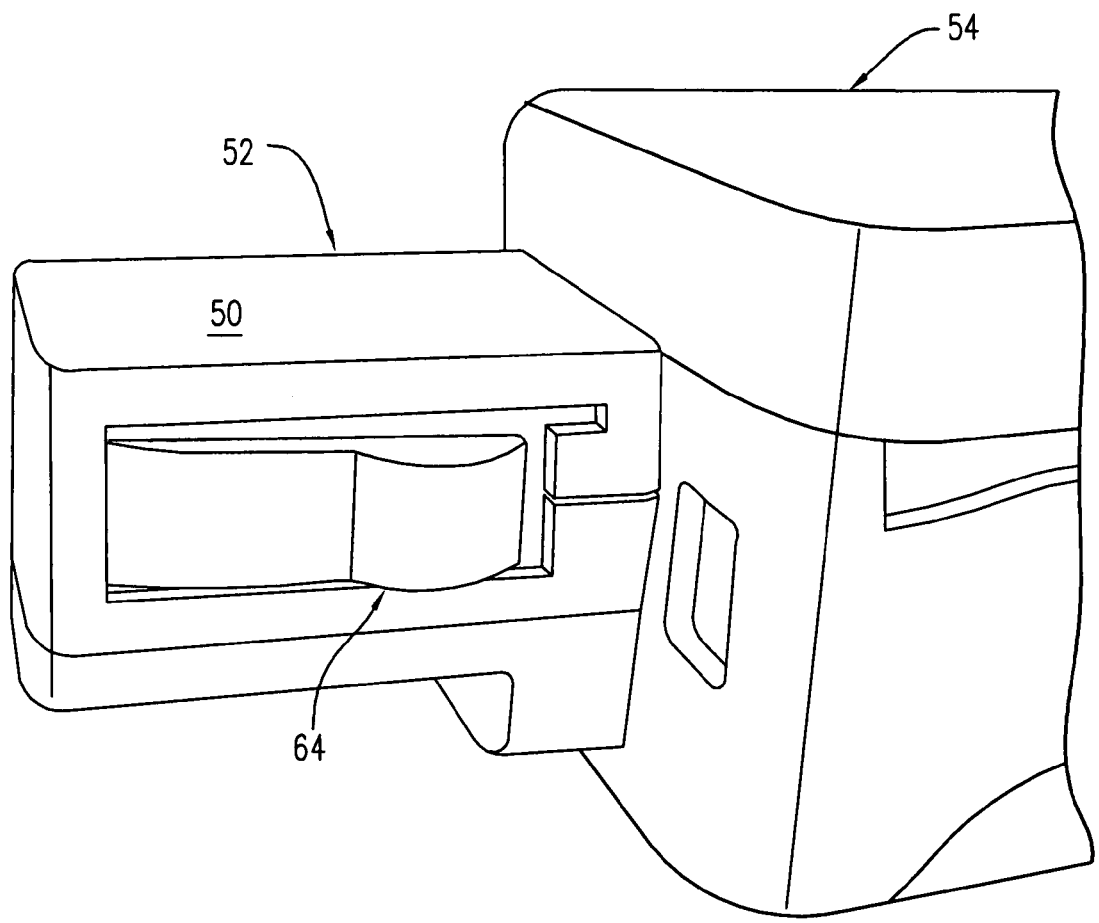

More specifically, as the user continues to supply insertion force (FIG. 2N, FIG. 2O), the retractable nibs 66 eventually engage with corresponding slots 202 defined in the female connector socket wall. In the exemplary illustrative non-limiting implementation, such slots are located and disposed in registry with the nib 66 positions when the male connector plug 50 is fully mated with the female connector socket 100. Upon such mating connection, the locking nibs 66 snap outwardly with a positive "click" sound and generate a corresponding tactile snap, thereby letting the user know that the male connector plug 50 has fully mated with the female connector socket 100 (FIG. 2P). At this fully mated point, the body of connector 50 may be in direct contact with an outer surface 67 defined by a device housing the female socket 100. The nib flat engaging surfaces 72 at this point engage, much as a ratchet engages with a pawl, with edges of the corresponding female socket wall slots 202 to firmly and strongly lock the connector plug into the mating connector socket 100. When locked, the connector plug 66 can move in and out by a very small distance in the exemplary illustrative non-limiting implementation, but is in fact firmly locked in place so that attempting to pull the connector plug out by force will be unsuccessful unless a very large amount of force is applied.

The locking mechanism (the retractable nib portion of which is shown in more detail in FIG. 8A—including the U-shaped structure 65) thus provides added degrees of safety and security since the accessory or other device that connector plug 50 connects to will generally not easily unintentionally separate from the corresponding female connector socket 100. This can provide significant benefits for example when a user is holding a video game remote controller with one hand, the remote controller providing a female connector socket 100 into which a wired connector plug 50 is inserted. As the user independently swings his or her left and right arms to operate the two different devices, for example, the exemplary illustrative locking mechanism shown including retractable nibs 66 and corresponding in-registration slots, grooves or other openings or similar structures maintains a firmly-locked electrical and mechanical connection. This prevents electrical connector 50 from unexpectedly and unintentionally flying out of the corresponding female connector socket 100 during such arm movements, thereby potentially avoiding injuries, inconvenience, and other potential occurrences caused by unintended disconnection.

In one exemplary illustrative non-limiting implementation, the locking mechanism is designed so it will fail and release the connector plug 50 from the connector socket 100 when a very substantial removal force is applied. Such a removal force can for example be somewhat or substantially less than the amount of force required to pull a cable out of the connector plug so that the locking mechanism will forceably release just before the cable strain release fails. Thus, the exemplary illustrative non-limiting locking mechanism is sufficiently stiff so that the connector will not come out accidentally, but is not so stiff that the cord will break first (locking mechanism strength is less than the tensile strength of the cable connected to the male connector 50 assuming a cable based connection is used).

In normal use, the user can easily withdraw the connector plug 50 from the connector socket 100 at any time by applying pressure onto control arms 64 and thereby cause the control arms to retract inwardly into the connector plug housing. As the user applies force to the control arms 64 and exceeds the biasing force that maintains the control arms in their outwardly protruding resting positions, the retractable nibs begin to retract into housing 54 (see FIG. 2C) and thus disengage from the female connector socket wall slots 202 or other engaging voids. As the user continues to apply more force, the control arms 64 continue to travel inwardly into the grippable portion 54 housing 56 interior. This causes locking nibs 66 to further retract into insertion portion 52, thereby in one exemplary illustrative non-limiting implementation freeing the connector insertion portion 52 from a mating receptacle engaging slot or other engaging structure(s). Once the locking nibs 66 are sufficiently retracted to disengage from corresponding slots, the user can then pull the male connector plug 50 outwardly away from the female connector socket 100 to slide out and thereby withdraw the plug from the socket 100.

As can be seen in FIG. 2A, the exemplary illustrative non-limiting implementation of male connector plug insertion portion 52 has one or more longitudinally defined raised portions or ribs 69 that are intended to maintain frictional contact with the female connector socket inner wall while limiting or reducing the total contact surface area between the withdrawing male connector plug insertion portion 52 and the female connector socket interior walls. Furthermore, during the operation of withdrawing the connector plug 50 from the female socket 100, the user can continue to maintain strong pressure on the control arms 64 with the same finger and thumb that is being used to apply withdrawal force in a direction away from the female connector socket 100, thereby maintaining the retractable nibs 66 in substantially or completely retracted positions so the nibs do not substantially add to the amount of force needed to withdraw the connector plug 50 from the connector socket 100. Such a withdrawal operation is therefore simple, does not require much dexterity or applied force, and therefore can be performed even by a small child without difficulty, In still other exemplary illustrative non-limiting implementations, the retractable nibs 66 could be formed in other ways and or omitted entirely. Although the exemplary illustrative non-limiting implementation shown includes a locking mechanism including retractable nibs 66, other arrangements could be used instead. For example, in some applications, a friction fit alone might be sufficient, or the force of gravity in combination with a friction fit could be used to keep the connector insertion portion 52 mated with a corresponding female connector receptacle.

Exemplary Male and Female Multilevel Interlocking Configurations

Figure 6:
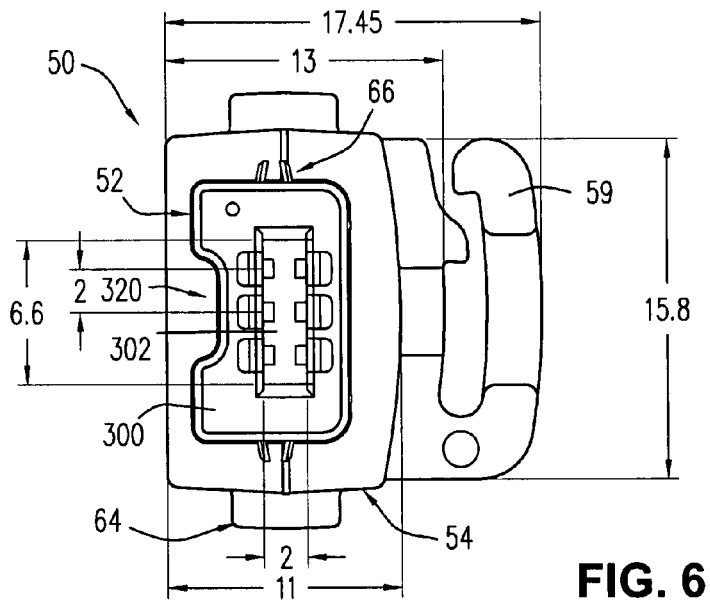
FIG. 6 shows a plan view of an exemplary illustrative non-limiting male plug six pin electrical contact arrangement.

FIG. 6 shows a forward-looking plan view looking down onto (and into) the male connector 50. One can see the insertion portion 52 which terminates in a planar surface 300 composed of plastic or other material. The exemplary illustrative male connector 50 defines, in this planar surface 300, a recess 302 in which the above-mentioned electrical contact strips are disposed. This recess 302 is dimensioned to receive a protrusion which is disposed within the female connector (socket). Thus, the male connector 50 in the exemplary illustration has a portion with a female receptacle for receiving a male protrusion portion of the female socket 100. Providing a male plug 50 with a female socket portion 302 and providing the female socket 100 with a male protrusion portion enhances ruggedness, reliability and mechanical strength through the application of multiple interlocking elements that surround one another. In the exemplary illustrative non-limiting implementation, the female socket male protrusion portion is received and surrounded by the male plug recess 302, which in turn is surrounded by the larger male projection 52 that is received within the female socket recess.

Figure 6A:
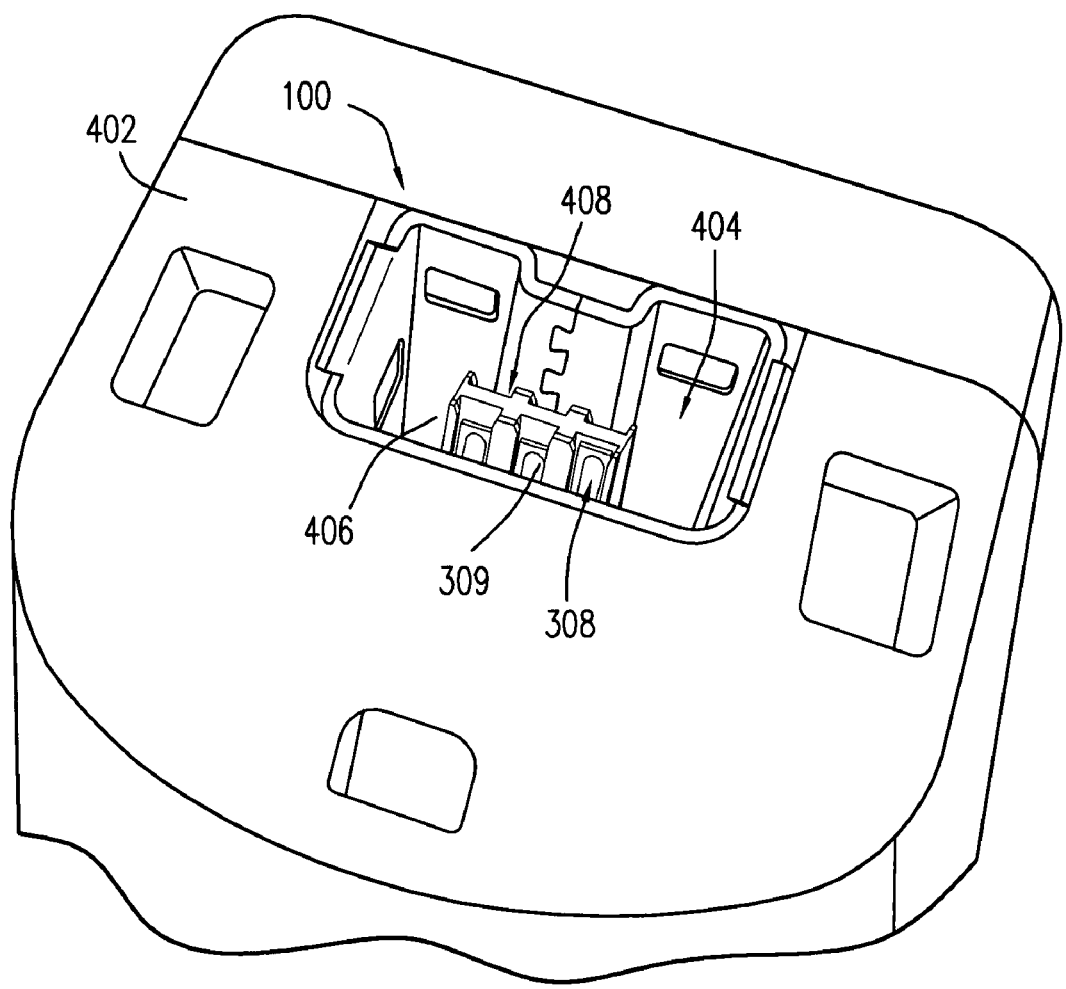
FIGS. 6A and 6B show perspective views of an exemplary illustrative non-limiting female connector socket contact arrangement.

The cross-sections of the different interlocking portions can be other than those shown in the Figures discussed above. For example, FIGS. 17a-18p illustrate various connector/plug configurations that include fully or partially compatible mechanical configurations in combination with compatible electrical configurations for the male projection 52 and female connector socket 100, each or any of which may be used to establish the desired electrical connection. However, as mentioned above, entirely different locking mechanisms could be substituted, such locking mechanisms including for example:

a lever-operated locking mechanism of the type often seen holding zero insertion force connector pins a retractable spring or other biased plunger, ball or the like a pure friction fit such as commonly used by USB connectors a threaded ring or other structure that screws onto a corresponding threaded shaft or other structure threaded shafts with knurled knobs that mate and interlock with corresponding threaded screw holes, of the type for example used for personal computer parallel and serial cables side protrusions of the type used commonly for USB male and female connectors any other suitable locking, retaining or friction fully engaging structural mechanism in suitable applications, a combination of friction and the force of gravity (e.g., docking ports or the like) while connector 50 is not in physical motion and has a generally downwards orientation any other suitable arrangement (for example, a locking mechanism that engages the slots on the bottom of a FIG. 6A remote controller rather than engaging the connector itself).

other

Exemplary Electrical Connection

Referring again to FIG. 1, the exemplary illustrative non-limiting implementation of male connection plug 50 includes a keyed or slotted insertion portion 52 having a substantially planar distal surface 300. Substantially planar distal surface 300 may define a rectangular opening 302 therein. Rectangular opening 302 may have channels 304a, b, c, e, f and g (sometimes referred to generally as "channels 304") defined therein. A portion 305 of each channel located at the front of the opening 302 is closed off with respect to the opening 302. Electrical contact strips (e.g., copper or other conductive strips) 306 may be disposed within the channels 304. These copper or other conductive contact strips 306 are dimensioned and disposed to make good electrical contact with corresponding electrical contacts 308 of mating female connector socket 100. See FIG. 12, which shows an exemplary illustrative non-limiting female connector socket 100 including a metal outer housing 402 defining an opening 404 that is dimensioned and shaped to conformaily match and accept, with close frictional engagement, the male connection plug insertion portion 52. Thus, for example, the cross-section of the male connection insertion portion 52 is the "positive" of a shape that is dimensioned to conformally match the shape and size of a "negative" or void defined within the space of opening 404 defined by the female mating connector socket metal housing 402. Of course, metal is just one example, any type of material could be used. Metal may have some advantages in terms of durability, ruggedness, scratch and breakage-resistance and ability to provide RF and noise shielding, but other materials could be used instead or in addition.

Referring again to FIG. 12, a channeled projection 406 is defined within the space or void 404 within the female connector socket 100. The channeled projection 406 has channels 408a, b, c, d, e and f (sometimes referred to generally as "channels 408") defined therein, the channels each having a copper or other electrically conductive strip 308 therein. The female connector channeled projection 406 is shaped and dimensioned to be inserted within the channeled rectangular opening 302 within the male connector plug insertion portion distal surface 300. When the male plug 50 mates with the female socket 100, the male plug insertion portion 52 is inserted within the female socket space 404 as described above, and the female socket channeled projection 406 is in turn inserted into the male plug rectangular opening 302. As the female socket channeled projection 406 is inserted into the male plug rectangular opening 302, the copper or other conductive strips 306 of the male plug 50 engage in close electrically conductive sliding contact with corresponding copper or other conductive strips 308 of the female socket 100. Such sliding contact establishes corresponding electrical connections for each of the six pairs of conductors shown. Different numbers of conductors could be used if desired. In some cases, unneeded ones of the conductive strips for particular applications can be omitted or made to be "no connection." As many connective strips as desired may be provided. In the example shown, a total of six connective strips are provided for six independent electrical connections. In some configurations, not all connections are used (for example, there may be no need in some applications to connect to a "battery" connection). In such cases, the female socket 100 could be provided with one more (unused) electrical contact than certain configurations of male plug 50, whereas other configurations of male plug 50 could have the same number of electrical contacts as the female socket 100, or vice versa. Other applications can of course have other configurations.

Figure 6B:
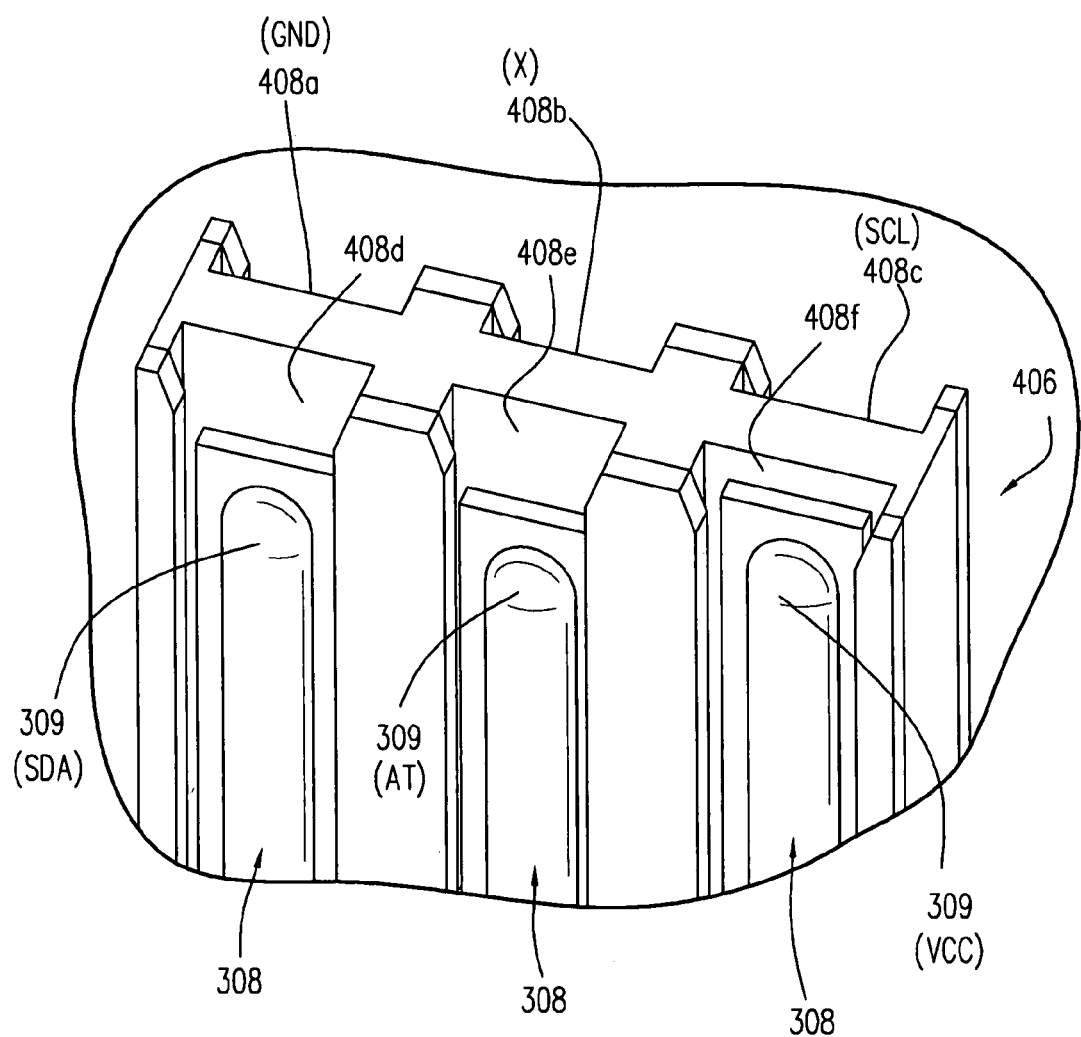
Figure 11:
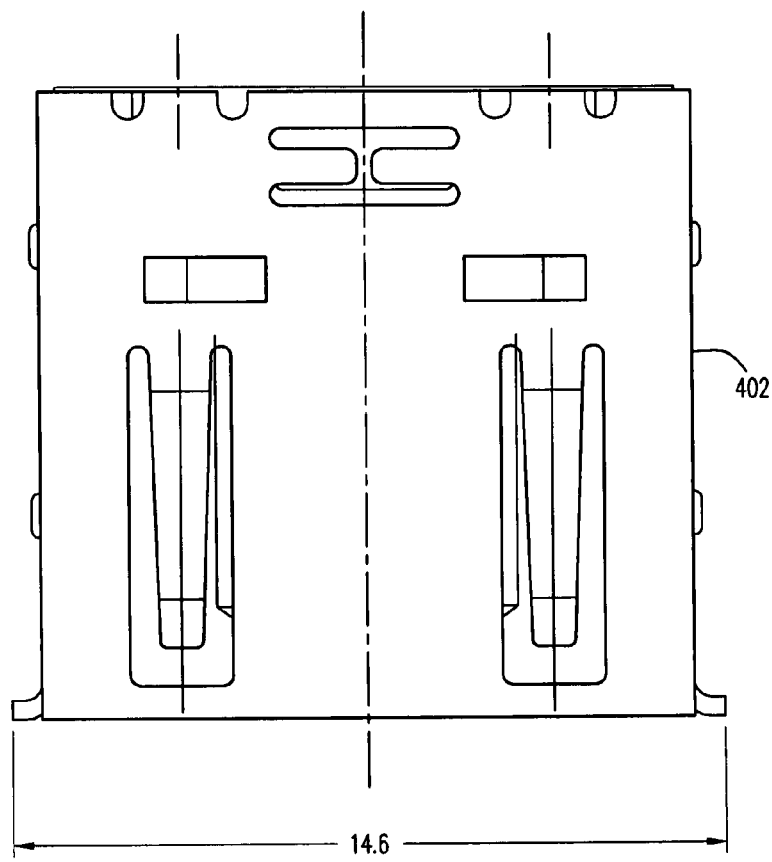
FIG. 11 shows a top exemplary illustrative non-limiting female connector metallic or other conductive socket shield.

FIGS. 6A and 6B show details of exemplary illustrative non-limiting copper or other conductive strips 308 as described above (strips 306 are similar). See also cross-sectional FIG. 8. As shown for example in FIG. 6B, each strip 308 comprises a thin strip of copper or other conductive metal or similar having a bulging portion 309 formed longitudinally therein. Such bulging or protruding portions can provide good sliding frictional electrical contact while minimizing the amount of force necessary to establish insertion. Furthermore, FIG. 6B shows that not all of the strips 308 in the female connector socket 100 are the same length. In one exemplary illustrative non-limiting implementation, certain of the strips 308 are shorter than others so that the longer strips make contact with counterpart strips 306 (which in one exemplary illustrative non-limiting implementation are all the same size) before the shorter ones make contact. For example, in one exemplary illustrative non-limiting implementation, it may be desirable to connect power and ground before making contact between data signal lines. This exemplary illustrated non-limiting connector conductive strip configurations shown provide such staged connections.

Figure 7A:
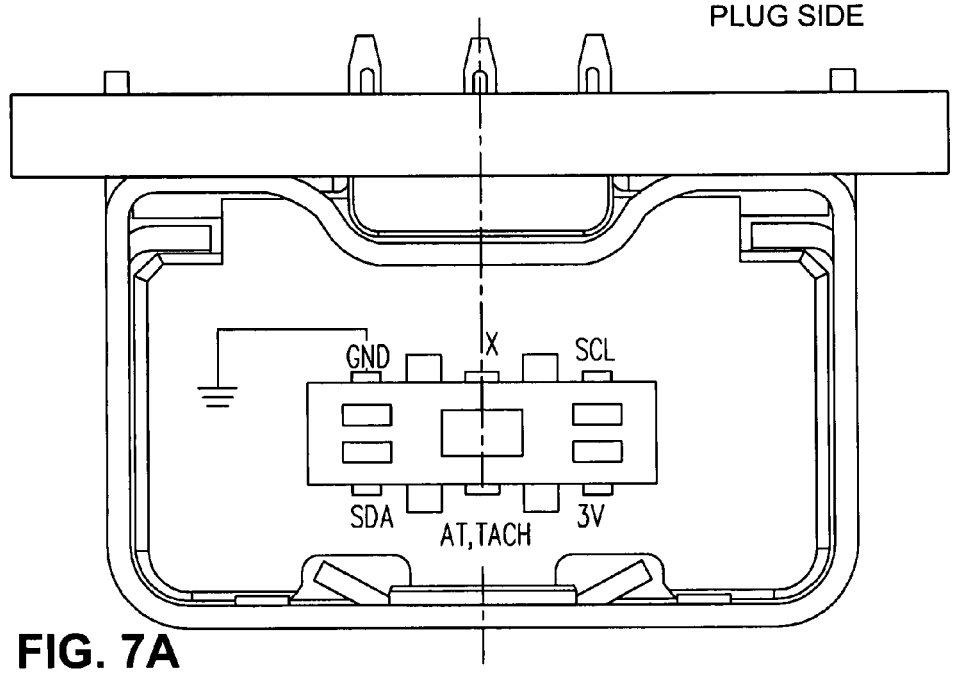
FIG. 7A is an exemplary illustrative non-limiting cross-section view of an exemplary illustrative non-limiting corresponding female plug connector showing exemplary electrical pin assignments.
Figure 7B:
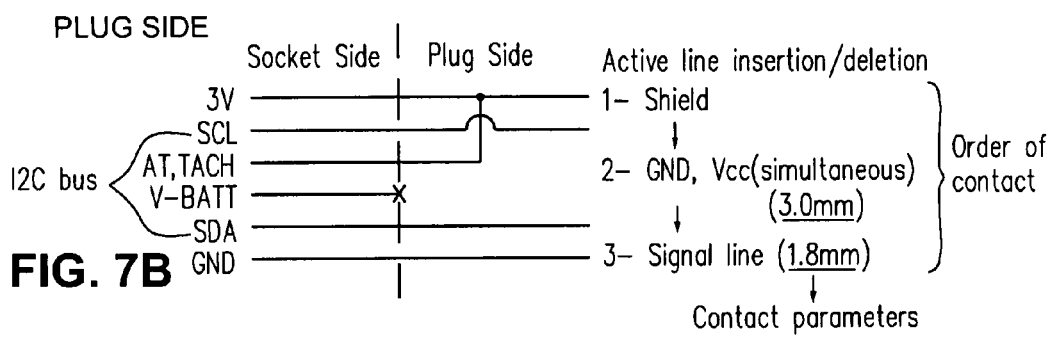
FIG. 7B is an exemplary illustrative non-limiting electrical circuit connection diagram.

FIGS. 7A and 7B show electrical wiring diagrams for the paired connection, and FIG. 8 shows a cross-section of an exemplary electrical connecting strip structure within male connector 50. The electrical connecting strips in the exemplary illustrative non-limiting implementation are made of a highly ductile, relatively stiff conductive material such as copper, aluminum or other metal. As perhaps best seen in FIG. 8, when pressure is applied to the copper strips due to engagement with additional copper strips within the female socket (see FIG. 6A), the copper strips in the male connector 50 flex outwardly. Forward ends of the copper strips rest against the closed off portions 305 of the channels formed on the sidewalk of the opening. An angled portion 307 projecting inwardly of the male connector copper strips protruding through a slotted opening in the male connector inner contact supporting structure 310 moves outwardly upon conformal engagement with a corresponding female connector structure. However, the springiness of the copper strips ensures that an inward mechanical bias continues to be applied, resulting in a pressure contact between the male and female connector mating contact strips. Such pressure contact provides effective and reliable highly-conductive electrical conductivity even when the copper strips are worn or oxidized after long use.

One exemplary illustrative non-limiting pin assignment configuration may be as follows for a six-pin male connector:

Pin 1: Vcc (3 volts)

Pin 2: SCL (serial clock line)

Pin 3: "Attach" (connected to Vcc on the male plug 50 side, sensed on the female socket 100 side to determine whether a plug is connected or not)

Pin 4: V-Batt (can be used for supplying external power through the connectors if desired; this connection is optional in many games)

Pin 5: SDA (serial data line)

Pin 6: Ground

In one implementation shown in FIG. 6B, Vcc and Ground (1 and 6) are in an exemplary illustrative non-limiting implementation made longer than the rest of the lines. This means that power and ground will be connected first, before the other signal lines. Furthermore, in the illustrative implementation, ground shield is connected first when the male and female connectors first come into contact (see for example FIG. 2I to 2). One exemplary illustrative non-limiting connection sequence is thus:

(1) shielding plates make contact (2) pins 1 and 6 (Vcc and ground) make contact simultaneously (3) pins 2-5 (all the rest) make contact.

Other variations are of course possible, e.g., pins 2-5 make contact first and then power and ground make contact.

Such earlier or staged connection helps to eliminate power surges etc.

Figure 3:
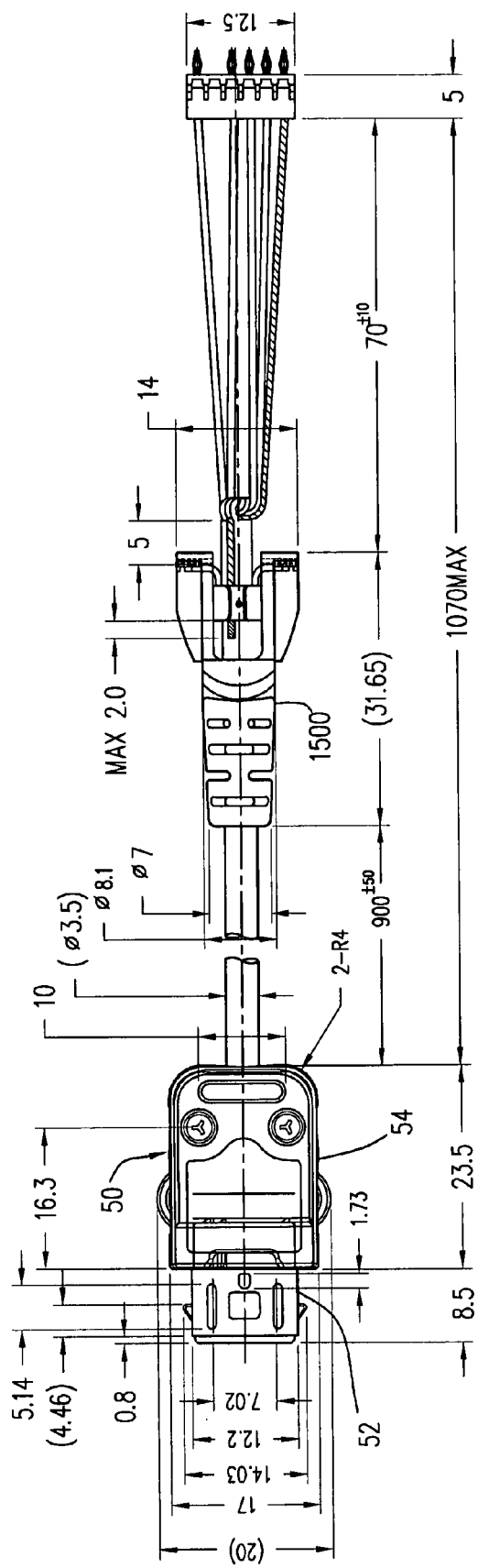
FIG. 3 shows a top view in plan of the FIG. 1 exemplary illustrative non-limiting male connector showing exemplary illustrative non-limiting dimensions in millimeters for an exemplary illustrative plug cable assembly.
Figure 4:
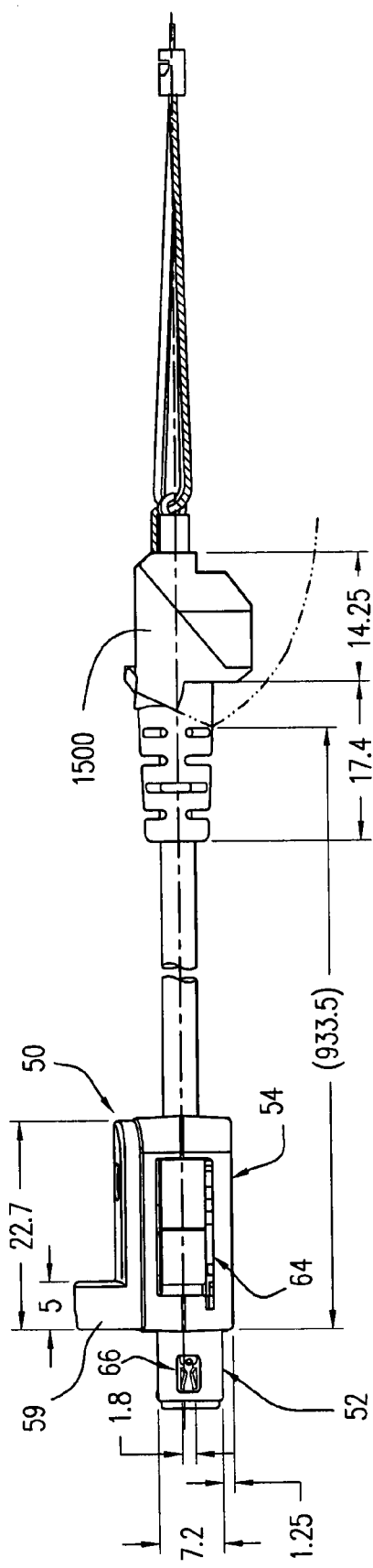
FIG. 4 shows a side elevation of the FIG. 3 exemplary male connector and cable assembly including dimensions in millimeters.
Figure 5:
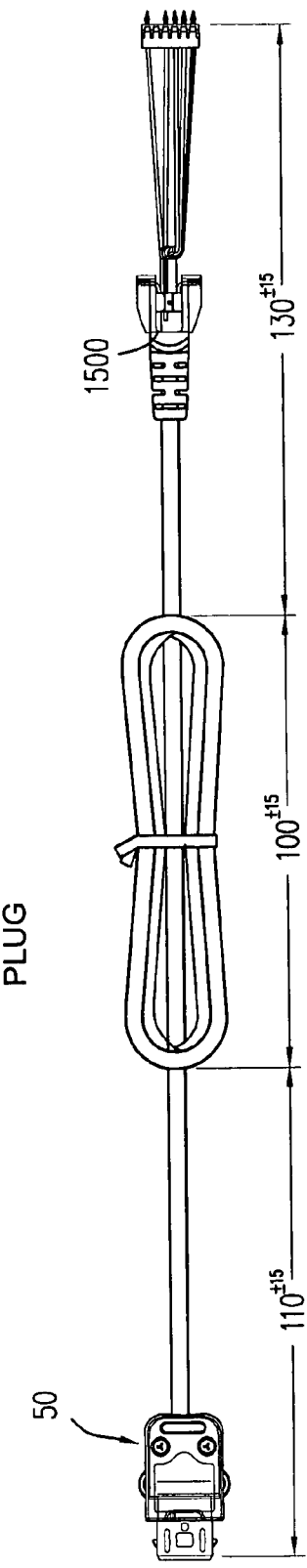
FIG. 5 shows further exemplary illustrative non-limiting cable assembly dimensions in millimeters.

FIGS. 3-5 show an exemplary illustrative non-limiting cable assembly including a multi-conductor cable with a male connector 50 at one end and an associated strain reliever 1500 at an opposite end. The dimensions shown in these drawings (in millimeters) are exemplary (different dimensions could be used if desired).

Keyed Configuration

FIG. 6B shows that the exemplary illustrative non-limiting implementation of the female connector 100 channeled projection 406 is symmetrical such that if taken by itself, it could be turned upside down and still connect equally well with the male connector plug rectangular opening conductors 306. However, FIG. 7A reveals that if the exemplary illustrative non-limiting implementation female connector channeled projection 406 were flipped in its connection orientation, then Vcc and Ground would be reversed, the clock line and the data line would be reversed, and the Attach and V-Batt lines would be reversed. This would not provide a compatible or even working connection in the exemplary illustrative non-limiting implementation. To avoid such inadvertent connection reversals, the outer profile of the male and female connector portions are keyed so they can made in only one orientation. See the longitudinal key slot, trough or channel 320 in the male connector plug 50 of FIG. 2 and the corresponding mating and engaging longitudinal plateau 450 shown in the illustrative exemplary non-limiting female connector socket 100 shown in FIG. 12. Note also the curved corners in each connector.

Figure 12:
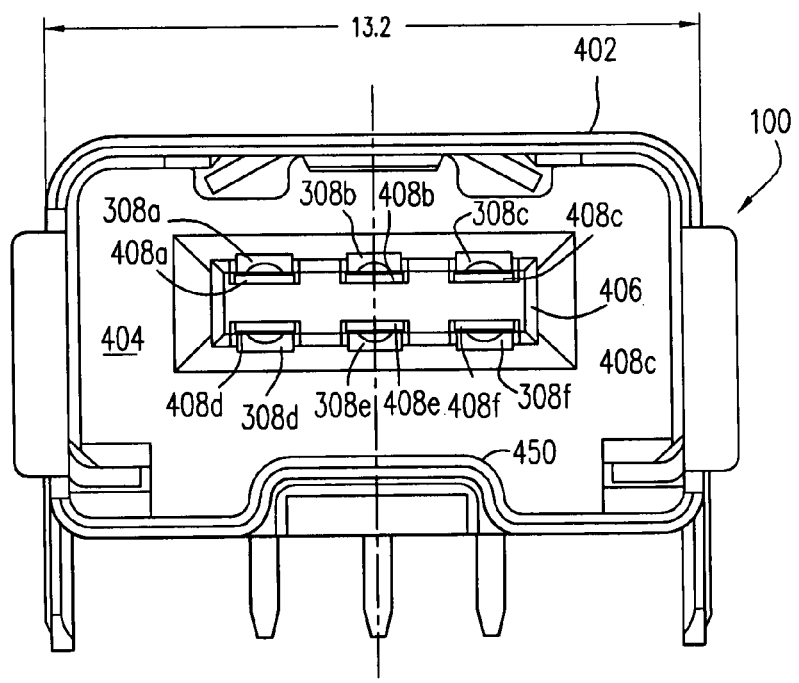
FIG. 12 is a side elevated view in plan of an exemplary illustrative non-limiting female connector in a flipped configuration as compared to FIG. 7A.
Figure 13:
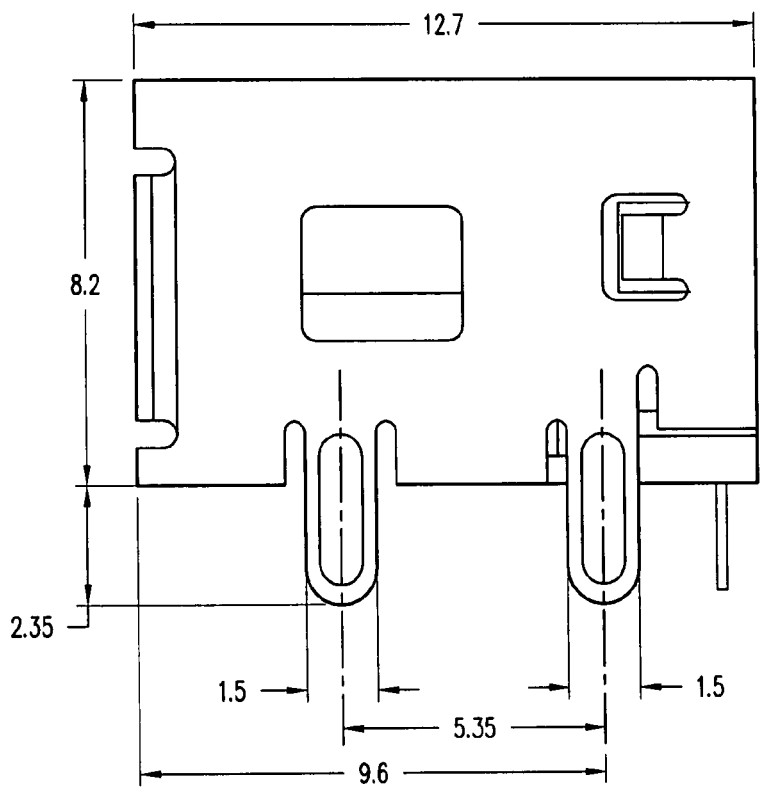
FIG. 13 is a side elevated plan view of the FIG. 11 exemplary illustrative non-limiting socket shield.
Figure 14:
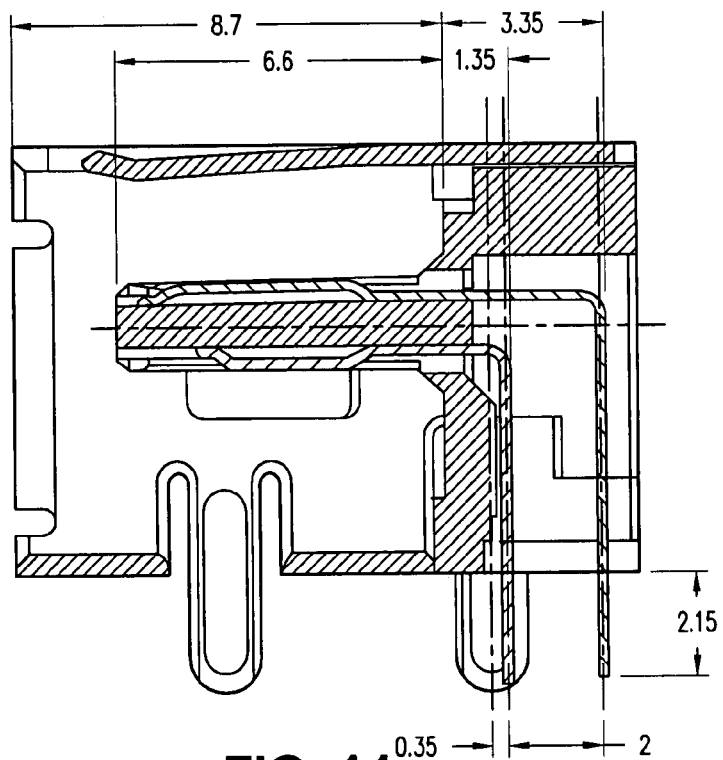
FIG. 14 shows the exemplary illustrative non-limiting socket shield in cross-section.
Figure 15:
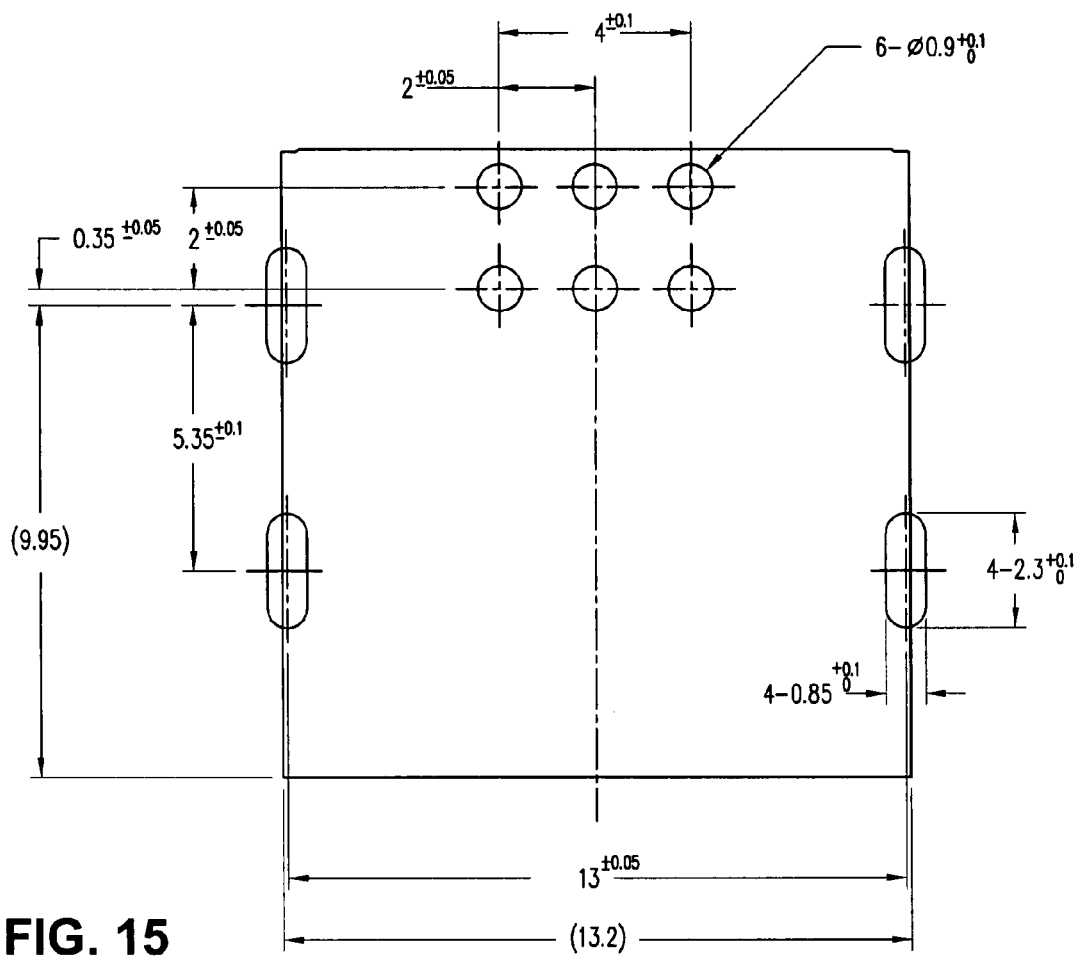
FIG. 15 shows exemplary illustrative non-limiting socket shield dimensions in millimeters.
Figure 16:
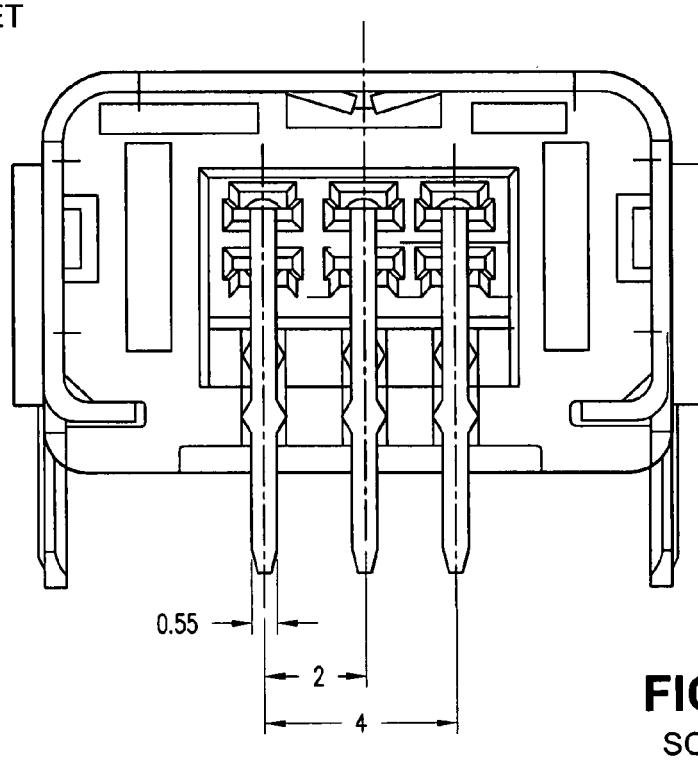
FIG. 16 show exemplary illustrative non-limiting socket shield printed circuit board contact dimensions in millimeters.
Figure 17A:
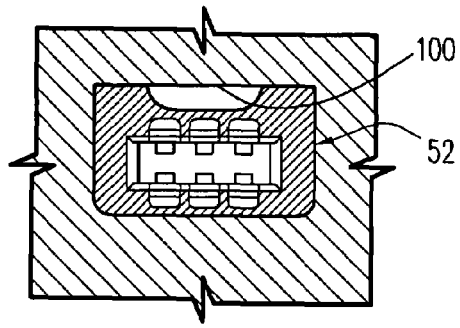
FIGS. 17A-17L show exemplary illustrative compatible or partially compatible non-limiting connector socket shapes.
Figure 17B:
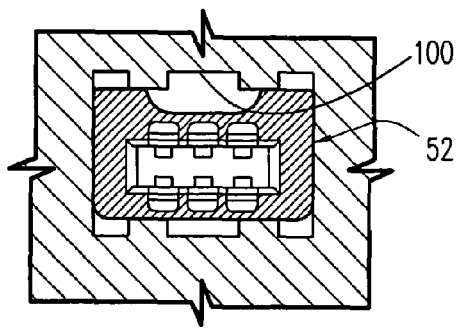
Figure 17C:
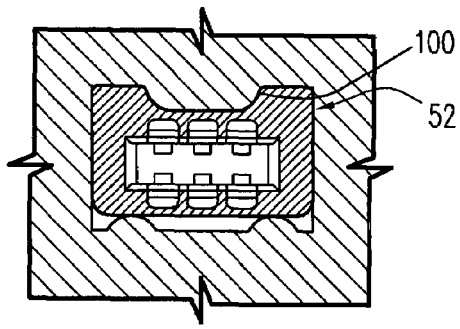
Figure 17D:
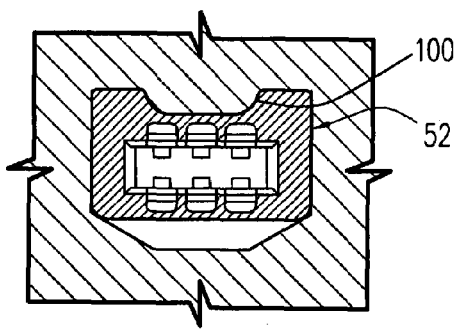
Figure 17E:
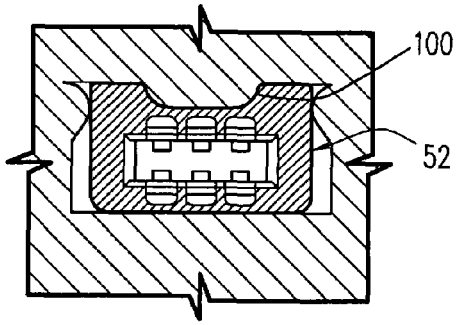
Figure 17F:
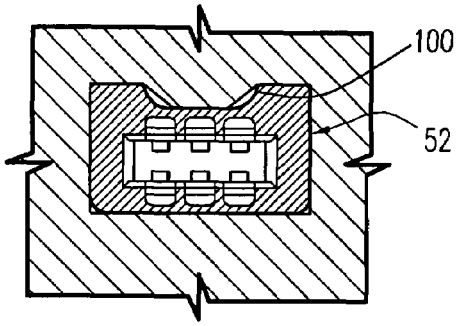
Figure 17G:
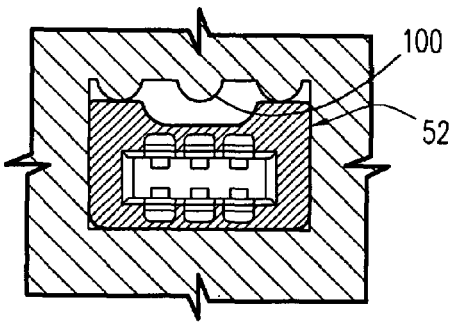
Figure 17H:
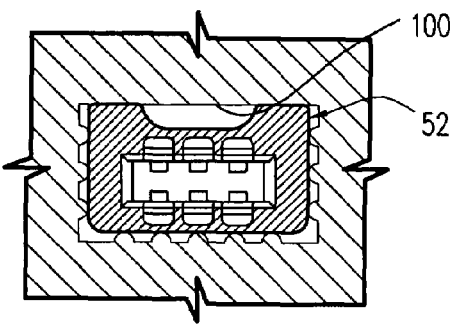
Figure 17I:
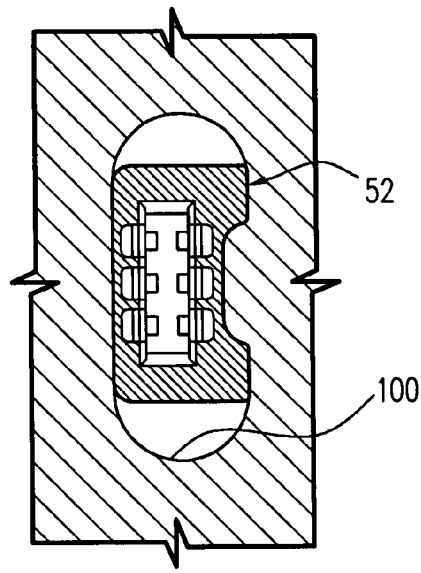
Figure 17J:
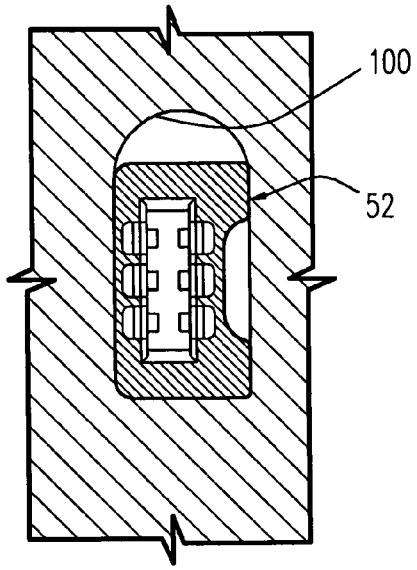
Figure 17K:
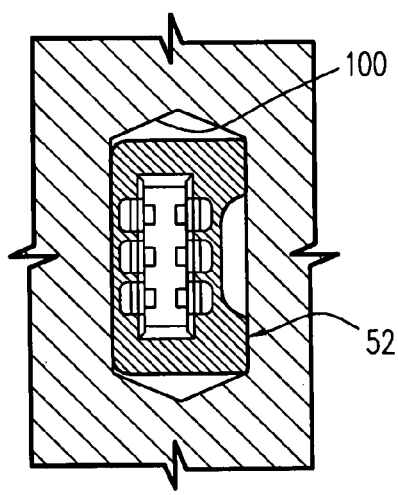
Figure 17L:
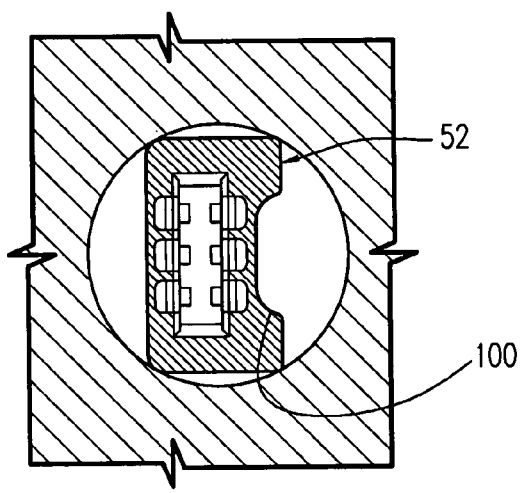

While such conformal keying wherein plateau 450 slides into trough 320 provides good compatibility, it should be understood that other cross-sectional shapes and profiles could similarly provide partial compatibility and orientation control without being entirely conformal. In particular, although the exemplary illustrative non-limiting implementations shown in FIGS. 1 and 12 provide substantially 100% complete conformality between the corresponding mating shapes, less than 100% conformality in shape and/or dimension might be attempted instead to nevertheless providing proper mating orientation, retention, etc.

Different Cross-Sectional Configurations

Figure 18A:
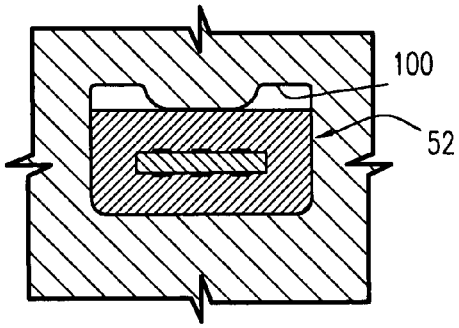
FIGS. 18A-18P show exemplary illustrative non-limiting compatible plug shapes.
Figure 18B:
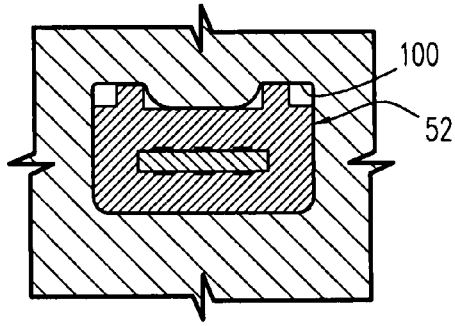
Figure 18C:
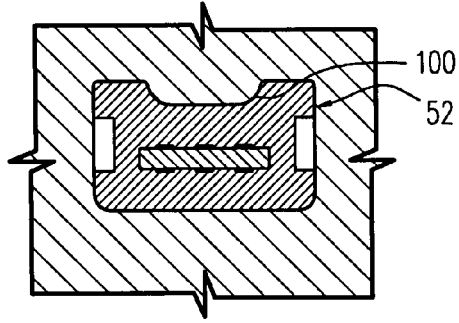
Figure 18D:
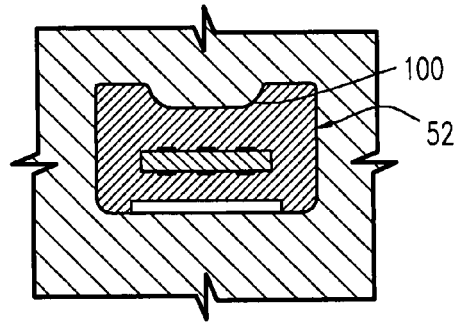
Figure 18E:
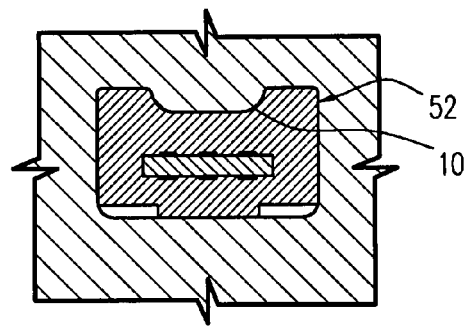
Figure 18F:
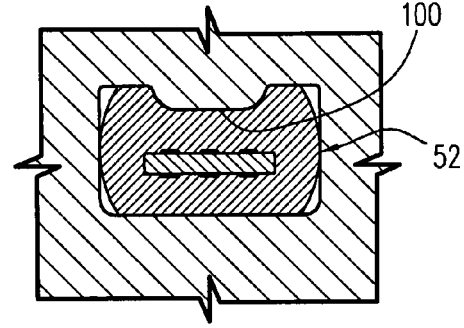
Figure 18G:
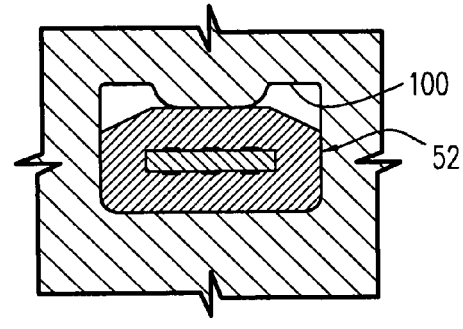
Figure 18H:
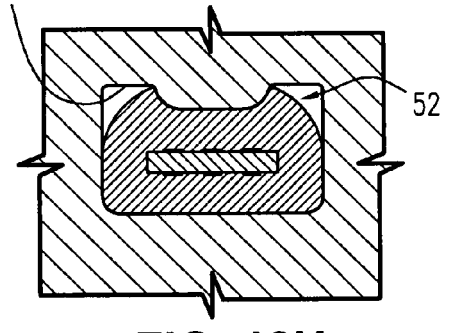
Figure 18I:
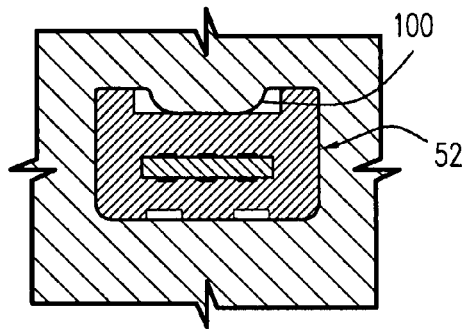
Figure 18J:
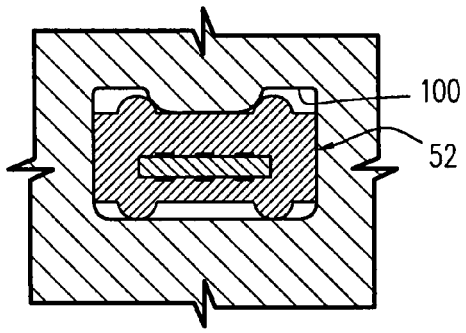
Figure 18K:
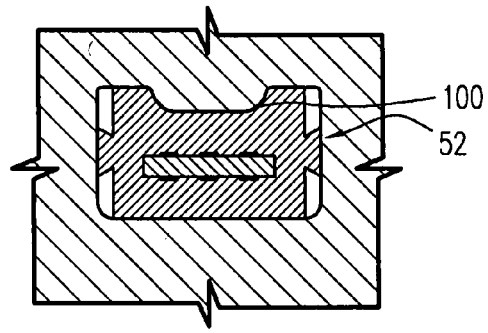
Figure 18L:
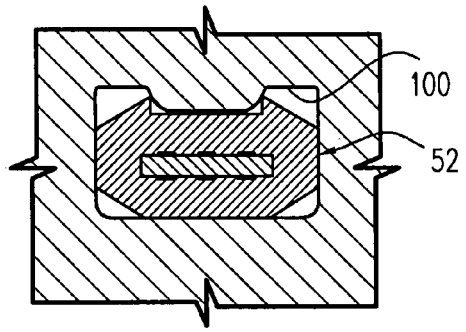
Figure 18M:
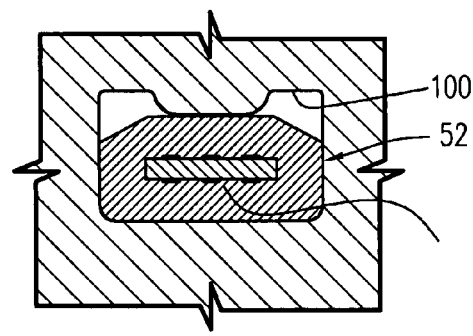
Figure 18N:
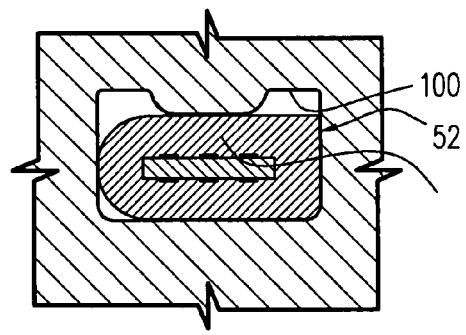
Figure 18O:
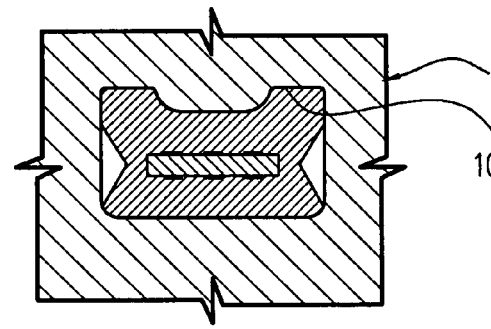
Figure 18P:
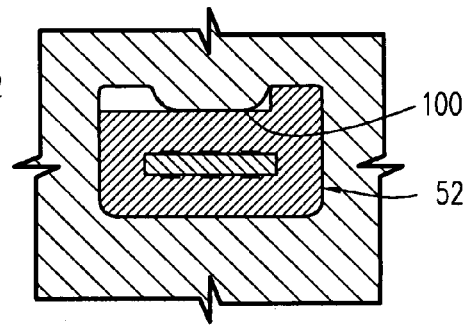

FIGS. 17A-17L provide non-exhaustive examples of female socket insertion cavity cross-sectional shapes that may accept a FIG. 1 male connector plug 50. FIGS. 18A-18P provide non-exhaustive examples of male connector plug cross-sectional shapes that may be accepted by the FIG. 12 female connector socket 100. There are a very large number of potential variations and possibilities, so the examples shown in these drawings are only representative.

One can assume that an unauthorized or unlicensed hardware manufacturer would try to make his or her connector as different as possible from an authentic connector while still achieving electrical and mechanical compatibility. Elements of electrical and mechanical compatibility include for example proper electrical connection of most of the six electrical connections in the exemplary implementation (at least data and clock line connections would presumably be wanted to provide electrical compatibility, although the pluggable device might be able to provide its own power it would presumably also tie to the common ground connection or to shield but perhaps not to both); and prevention or correction in some way, shape or form from reversed orientation such that those lines are not reversed (although in some circumstances one could envision simply telling the user to try it one way or the other until it works since there are only two possibilities, so long as pin assignment is made carefully to avoid short-circuits).

Elements of mechanical compatibility depend to some extent on the particular application. Rugged, locking, conformal compatibility is probably useful for many applications. However, in applications where not much movement is involved, then perhaps the locking mechanism could be dispensed with or not used, and less conformality might be used. Less conformal might weaken ruggedness, but other precautions (e.g., additional means of attachment or stabilization) might be used to compensate. In some applications such as stationary docking port applications involving very little motion, the aspects of mechanical conformality used for compatibility might be reduced. By setting for these illustrative non-limiting shapes and examples, applicants intend to capture any and all ways to compatibly connect to either the FIG. 1 (male) connector or to the FIG. 12 (female) connector.

All dimensions herein and in the drawings are in millimeters. Tolerances are plus or minus 0.3 mm.

While the technology herein has been described in connection with exemplary illustrative non-limiting implementations, the invention is not to be limited by the disclosure. For example, other connection means including sleeves, clip down, tie downs, plunger based retaining mechanisms, discrete fingers, capacitive or inductive proximity sensors, optical couplers and other variations could be used instead of what is described above. Although the exemplary illustrative non-limiting implementation connects video game systems, other arrangements are also possible. The invention is intended to be defined by the claims and to cover all corresponding and equivalent arrangements whether or not specifically disclosed herein.

We claim:

1. A video game accessory connector, comprising:
   a grasping portion;
   a male insertion portion that protrudes from the grasping portion, the male insertion portion being insertable into a mating female connector defined within a handheld video game remote control that can sense its own orientation, the male insertion portion comprising:
   exterior sides and a distal end,
   a recess that opens onto the distal end being formed in the male insertion portion,
   recessed channels formed on each of two opposing interior walls of the recess, wherein a portion of each recessed channel located at the opening of the recess is closed off with respect to the recess, and
   a plurality of electrical contacts that are mounted on the two opposing interior walls of the recess, each electrical contact being mounted in a recessed channel, wherein an intermediate portion of each electrical contact extends outward from the recessed channel and into the recess.

2. The connector of claim 1, further including a channel structure that provides unidirectional interlocking of the male insertion portion with a mating female connector.

3. The connector of claim 1, wherein said electrical contacts in said recess are adapted to make contact in a predetermined time-sequenced order with mating contacts of a mating female connector as said male insertion portion mates with a receiving portion of the mating female connector.

4. The connector of claim 3, wherein ends of the electrical contacts in the recess are located at different depths in the recess such that the electrical contacts will engage mating contacts of a mating female connector in a time-sequenced order as the male insertion portion mates with the mating female connector.

5. The connector of claim 3, wherein ends of the electrical contacts in the recess are all located at substantially the same depth in the recess such that as the male insertion portion is inserted into a receiving portion of a mating female connector that has corresponding electrical contacts located at different depths in the receiving portion, the electrical contacts in the recess of the male insertion portion will mate with the electrical contacts in the mating female connector in a time-sequenced order.

6. The connector of claim 1, further including a wrist strap hook attached to the grasping portion for receiving and securely retaining a wrist strap.

7. The connector of claim 1, wherein said connector further includes a housing that is substantially 17 mm×32 mm and includes an integral cable strain relief.

8. The connector of claim 1, wherein said recess is substantially rectangular in cross-section.

9. The connector of claim 1, wherein said recess is not rectangular in cross-section but is designed and dimensioned to receive and frictionally engage with a protrusion on a mating female connector that is substantially rectangular in cross-section.

10. The connector of claim 1, wherein each of the electrical contacts has a profile that biases the protruding portion outward from the recessed channel and into the recess.

11. The connector of claim 10, wherein the plurality of contacts are oriented such that when the male insertion portion is inserted into a mating female connector, a protrusion in the mating female connector will be received in the recess and the plurality of electrical contacts mounted on the interior walls of the recess will engage corresponding electrical contacts located on opposing exterior sides of the protrusion in the mating female connector.

12. The connector of claim 1, wherein only two electrical contacts are formed on a first interior wall of the recess, and wherein three electrical contacts are formed on a second interior wail of the recess that faces the first interior wall.

13. The connector of claim 12, wherein the two electrical contacts formed on the first interior wall of the recess are located across from electrical contacts located at the ends of the second interior wall of the recess.

14. The connector of claim 12, wherein a concave channel is formed in an exterior wall of the male insertion portion that forms an opposite side of the first interior wall of the recess, the concave channel ensuring unidirectional interlocking of the male insertion portion with a mating female connector.

15. The connector of claim 1, wherein ends of the electrical contacts located adjacent the opening into the recess abut walls of the closed off portions of the recessed channels.

16. The connector of claim 1, wherein the plurality of electrical contacts are shaped such that a distance between two electrical contacts located opposite each other in the recess is smaller at an intermediate depth within the recess than at the opening of the recess.

17. The connector of claim 1, wherein a recess formed in an exterior side of the male insertion portion is designed to receive a protrusion on an interior wall of a mating female connector.

18. The connector of claim 1, further comprising:
a nib that is retractably mounted on the male insertion portion; and
an actuating element that is mounted on the grasping portion such that a user can depress the actuating element, and wherein the actuating element is coupled to the nib such that when a user depresses the actuating element, the nib is at least partially retracted into the male insertion portion.

19. The connector of claim 1, further comprising:
a plurality of nibs that are retractably mounted on the male inspection portion; and
at least one actuating element that is mounted on the grasping portion such that a user can depress the at least one actuating element, wherein the at least one actuating clement is coupled to the nibs such that when a user depresses the at least one actuating element, the nibs are at least partially retracted into the male insertion portion.

20. The connector of claim 19, wherein the at least one actuating element comprises plural actuating elements to respectively retract said retractable nibs in response to pressure applied by human digits.

21. The connector of claim 20 wherein said nibs are located at remote ends of opposite arms of a single U-shaped structure, and wherein said actuating elements apply said pressure to said arms of the U-shaped structure to thereby cause said nibs to retract.

22. The connector of claim 21, wherein the U-shaped structure comprises a thin, flat strip of metal, and wherein a base of the U-shaped structure comprises a flexible cross-brace connecting said flexible arms.

23. The connector of claim 21, wherein the nibs comprise bent portions of the remote ends of the arms of the U-shaped structure that have been bent 90 degrees with respect to the remaining portions of the ends of the arms.

24. The connector of claim 1, further comprising ribs formed on the exterior sides of the male insertion portion, wherein the ribs ensure that the exterior sides of the male insertion portion make intermittent contact with interior sides of a mating female connector when the male insertion portion is inserted into the mating female connector.

25. The connector of claim 1, wherein the plurality of electrical contacts are movably mounted in the recessed channels, wherein the electrical contacts are biased towards a center of the recess, and wherein ends of the electrical contacts adjacent the opening of the recess abut the closed off portion of the recessed channels to limit how far into the center of the recess the electrical contacts can move.

26. The connector of claim 25, wherein the intermediate portion of each of the electrical contacts comprises a bent portion that extends from one of the recessed channels into the recess.

27. A video game accessory connector plug, comprising:
an elongated housing having a pair of grippable sides;
a male insertion portion having a smaller cross-sectional area than said housing projecting from a forward end of said housing, said male insertion portion having a substantially rectangular cross-sectional shape, with an exterior slot formed in one wall of said male insertion portion, extending along a longitudinal center axis of said housing, and a pair of ribs extending along an exterior surface of an opposite wall of said male insertion portion, said ribs substantially parallel to each other and to said slot; and wherein a planar surface at a distal end of said male insertion portion is formed with a recess; and
a plurality of electrical contacts supported in respective channels formed in walls bounding said recess, said electrical contacts arranged in two groups of aligned contacts in facing relationship, on opposite sides of said recess, said contacts including at least a serial data line, a clock line, power and ground.

28. The connector of claim 27, wherein ends of the channels located at the opening into the recess are closed off with respect to the recess.

29. The connector of claim 28, wherein the plurality of electrical contacts are movably mounted in the respective channels, and wherein movement of the electrical contacts from the channels into the recess is limited by engagement of the electrical contacts with the closed off portions of the channels.

30. The connector of claim 29, wherein each of the electrical contacts have a profile which biases an intermediate portion of the contact into the recess.

* * * * *